(12) United States Patent
Morigami et al.

(10) Patent No.: US 11,223,824 B2
(45) Date of Patent: Jan. 11, 2022

(54) IMAGE PROCESSING APPARATUS AND IMAGE PROCESSING METHOD

(71) Applicants: SONY CORPORATION, Tokyo (JP); SONY SEMICONDUCTOR SOLUTIONS CORPORATION, Kanagawa (JP)

(72) Inventors: Yoshitaka Morigami, Tokyo (JP); Takefumi Nagumo, Kanagawa (JP); Hironari Sakurai, Kanagawa (JP); Takashi Fukuyama, Tokyo (JP)

(73) Assignees: SONY CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/761,073

(22) PCT Filed: Oct. 10, 2018

(86) PCT No.: PCT/JP2018/037725
§ 371 (c)(1),
(2) Date: May 1, 2020

(87) PCT Pub. No.: WO2019/093051
PCT Pub. Date: May 16, 2019

(65) Prior Publication Data
US 2021/0185305 A1   Jun. 17, 2021

(30) Foreign Application Priority Data
Nov. 9, 2017 (JP) .............................. JP2017-216209

(51) Int. Cl.
*H04N 19/105* (2014.01)
*H04N 19/109* (2014.01)
(Continued)

(52) U.S. Cl.
CPC ......... *H04N 19/105* (2014.11); *H04N 19/109* (2014.11); *H04N 19/136* (2014.11); *H04N 19/142* (2014.11); *H04N 19/176* (2014.11)

(58) Field of Classification Search
CPC .. H04N 19/105; H04N 19/109; H04N 19/142; H04N 19/176; H04N 19/136
See application file for complete search history.

(56) References Cited

U.S. PATENT DOCUMENTS

2009/0129471 A1   5/2009   Kitajima
2011/0129015 A1   6/2011   Nguyen et al.
(Continued)

FOREIGN PATENT DOCUMENTS

| EP | 3158751 A1 | 4/2017 |
| JP | 2008-005145 A | 1/2008 |
| WO | WO 2015/196322 A1 | 12/2015 |

OTHER PUBLICATIONS

Jul. 14, 2020, European Search Report issued for related EP application No. 18876796.6.

*Primary Examiner* — Nasim N Nirjhar
(74) *Attorney, Agent, or Firm* — Paratus Law Group, PLLC

(57) ABSTRACT

A reference direction determination unit 44 detects, using an input image, a scene change, a flash scene, or a monotonous luminance variation section. In a case where an encoding target image is the scene change or flash scene, the reference direction determination unit 44 determines its mode as a fixed reference direction mode in which a reference direction in a screen is fixed uniformly. Further, in a case where the encoding target image is the monotonous luminance variation section, that is, a section where luminance of an entire screen monotonously increases or monotonously decreases, the reference direction determination unit 44 determines as the fixed reference direction mode in which (Continued)

the reference direction in the screen is fixed uniformly. A motion prediction/compensation unit 42 performs inter prediction processing according to a determination result of the reference direction determination unit 44, thereby enabling efficient encoding while suppressing deterioration of image quality.

19 Claims, 31 Drawing Sheets

(51) Int. Cl.
*H04N 19/136* (2014.01)
*H04N 19/142* (2014.01)
*H04N 19/176* (2014.01)

(56) References Cited

U.S. PATENT DOCUMENTS

| | | |
|---|---|---|
| 2015/0341083 A1* | 11/2015 | Samy ............... H04N 19/63 375/240.19 |
| 2018/0005080 A1* | 1/2018 | Sugimura ............ G06K 9/6212 |
| 2018/0098086 A1* | 4/2018 | Chuang ................ H04N 19/43 |
| 2019/0166370 A1* | 5/2019 | Xiu ..................... H04N 19/147 |
| 2020/0021824 A1* | 1/2020 | Taubman ............... G06T 9/001 |

\* cited by examiner

FIG. 12

Sample adaptive offset syntax

| sao( rx, ry ) { | Descriptor |
|---|---|
|   if( rx > 0 ) { | |
|     leftCtbInSliceSeg = CtbAddrInRs > SliceAddrRs | |
|     leftCtbInTile = TileId[ CtbAddrInTs ] = = TileId[ CtbAddrRsToTs[ CtbAddrInRs − 1 ] ] | |
|     if( leftCtbInSliceSeg && leftCtbInTile ) | |
|       sao_merge_left_flag | ae(v) |
|   } | |
|   if( ry > 0 && !sao_merge_left_flag ) { | |
|     upCtbInSliceSeg = ( CtbAddrInRs − PicWidthInCtbsY ) >= SliceAddrRs | |
|     upCtbInTile = TileId[ CtbAddrInTs ] = = <br>        TileId[ CtbAddrRsToTs[ CtbAddrInRs − PicWidthInCtbsY ] ] | |
|     if( upCtbInSliceSeg && upCtbInTile ) | |
|       sao_merge_up_flag | ae(v) |
|   } | |
|   if( !sao_merge_up_flag && !sao_merge_left_flag ) | |
|     for( cIdx = 0; cIdx < ( ChromaArrayType != 0 ? 3 : 1 ); cIdx++ ) | |
|       if( ( slice_sao_luma_flag && cIdx = = 0 ) \|\| <br>        ( slice_sao_chroma_flag && cIdx > 0 ) ) { | |
|         if( cIdx = = 0 ) | |
|           sao_type_idx_luma | ae(v) |
|         else if( cIdx = = 1 ) | |
|           sao_type_idx_chroma | ae(v) |
|         if( SaoTypeIdx[ cIdx ][ rx ][ ry ] != 0 ) { | |
|           for( i = 0; i < 4; i++ ) | |
|             sao_offset_abs[ cIdx ][ rx ][ ry ][ i ] | ae(v) |
|           if( SaoTypeIdx[ cIdx ][ rx ][ ry ] = = 1 ) { | |
|             for( i = 0; i < 4; i++ ) | |
|               if( sao_offset_abs[ cIdx ][ rx ][ ry ][ i ] != 0 ) | |
|                 sao_offset_sign[ cIdx ][ rx ][ ry ][ i ] | ae(v) |
|             sao_band_position[ cIdx ][ rx ][ ry ] | ae(v) |
|           } else { | |
|             if( cIdx = = 0 ) | |
|               sao_eo_class_luma | ae(v) |
|             if( cIdx = = 1 ) | |
|               sao_eo_class_chroma | ae(v) |
|           } | |
|         } | |
|       } | |
| } | |

FRa, FRb

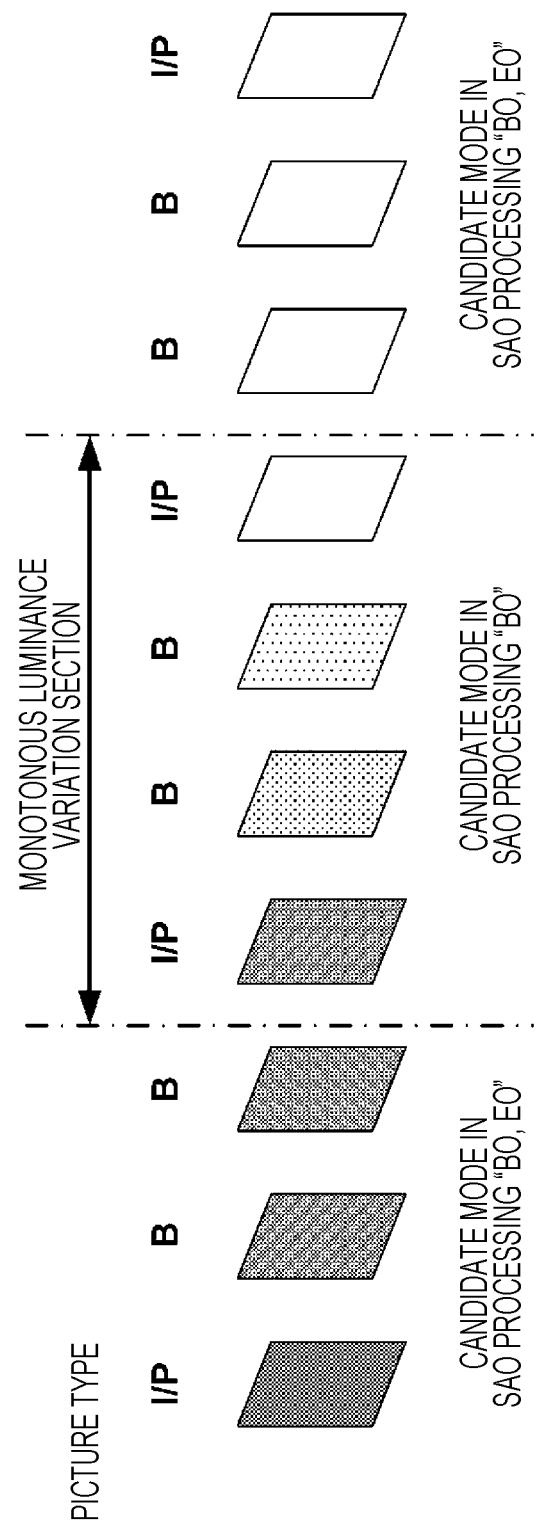

FIG. 17

Reference picture list modification syntax

| ref_pic_list_modification( ) { | C | Descriptor |
|---|---|---|
|   if( slice_type % 5 != 2 && slice_type % 5 != 4 ) { | | |
|     ref_pic_list_modification_flag_l0 | 2 | u(1) |
|     if( ref_pic_list_modification_flag_l0 ) | | |
|       do { | | |
|         modification_of_pic_nums_idc | 2 | ue(v) |
|         if( modification_of_pic_nums_idc == 0 \|\| <br>          modification_of_pic_nums_idc == 1 ) | | |
|         abs_diff_pic_num_minus1 | 2 | ue(v) |
|         else if( modification_of_pic_nums_idc == 2 ) | | |
|         long_term_pic_num | 2 | ue(v) |
|       } while( modification_of_pic_nums_idc != 3 ) | | |
|   } | | |
|   if( slice_type % 5 == 1 ) { | | |
|     ref_pic_list_modification_flag_l1 | 2 | u(1) |
|     if( ref_pic_list_modification_flag_l1 ) | | |
|       do { | | |
|         modification_of_pic_nums_idc | 2 | ue(v) |
|         if( modification_of_pic_nums_idc == 0 \|\| <br>          modification_of_pic_nums_idc == 1 ) | | |
|         abs_diff_pic_num_minus1 | 2 | ue(v) |
|         else if( modification_of_pic_nums_idc == 2 ) | | |
|         long_term_pic_num | 2 | ue(v) |
|       } while( modification_of_pic_nums_idc != 3 ) | | |
|   } | | |
| } | | |

FRc (upper dashed region: modification_of_pic_nums_idc ... abs_diff_pic_num_minus1)

FRd (lower dashed region: modification_of_pic_nums_idc ... abs_diff_pic_num_minus1)

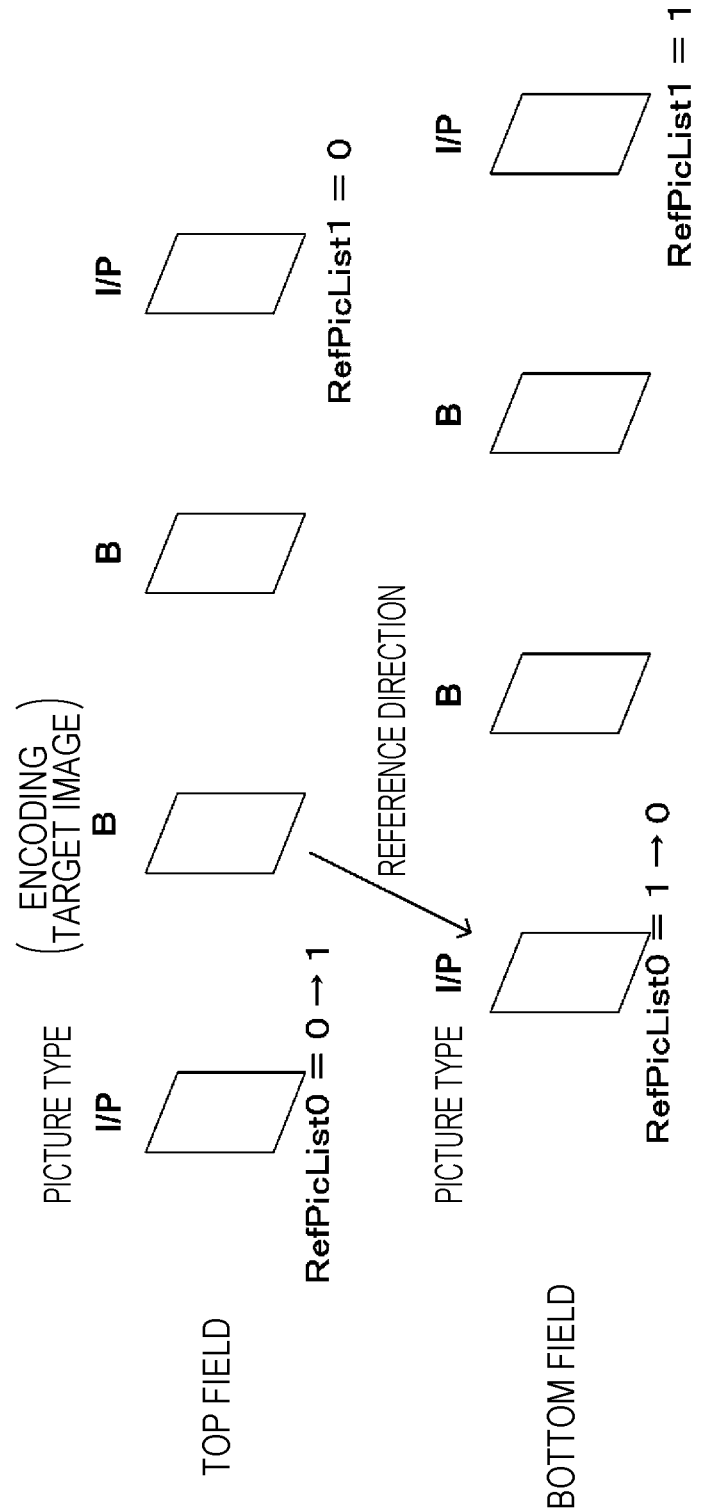

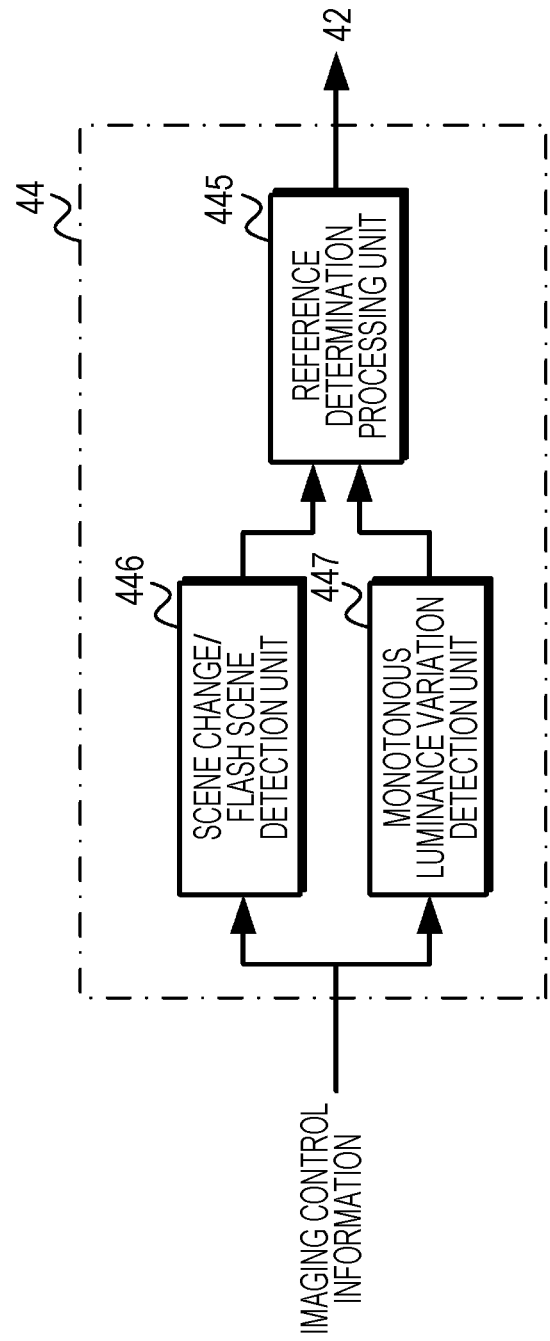

FIG. 26

Macroblock layer syntax

| macroblock_layer( ) { | C | Descriptor | |
|---|---|---|---|
| mb_type | 2 | ue(v) \| ae(v) | ← FRe |
| if( mb_type == I_PCM ) { | | | |
| while( !byte_aligned( ) ) | | | |
| pcm_alignment_zero_bit | 3 | f(1) | |
| for( i = 0; i < 256; i++ ) | | | |
| pcm_sample_luma[ i ] | 3 | u(v) | |
| for( i = 0; i < 2 * MbWidthC * MbHeightC; i++ ) | | | |
| pcm_sample_chroma[ i ] | 3 | u(v) | |
| } else { | | | |
| noSubMbPartSizeLessThan8x8Flag = 1 | | | |
| if( mb_type != I_NxN && <br> MbPartPredMode( mb_type, 0 ) != Intra_16x16 && <br> NumMbPart( mb_type ) == 4 ) { | | | |
| sub_mb_pred( mb_type ) | 2 | | |
| for( mbPartIdx = 0; mbPartIdx < 4; mbPartIdx++ ) | | | |
| if( sub_mb_type[ mbPartIdx ] != B_Direct_8x8 ) { | | | |
| if( NumSubMbPart( sub_mb_type[ mbPartIdx ] ) > 1 ) | | | |
| noSubMbPartSizeLessThan8x8Flag = 0 | | | |
| } else if( !direct_8x8_inference_flag ) | | | |
| noSubMbPartSizeLessThan8x8Flag = 0 | | | |
| } else { | | | |
| if( transform_8x8_mode_flag && mb_type == I_NxN ) | | | |
| transform_size_8x8_flag | 2 | u(1) \| ae(v) | |
| mb_pred( mb_type ) | 2 | | |
| } | | | |
| if( MbPartPredMode( mb_type, 0 ) != Intra_16x16 ) { | | | |
| coded_block_pattern | 2 | me(v) \| ae(v) | |
| if( CodedBlockPatternLuma > 0 && <br> transform_8x8_mode_flag && mb_type != I_NxN && <br> noSubMbPartSizeLessThan8x8Flag && <br> ( mb_type != B_Direct_16x16 \|\| direct_8x8_inference_flag ) ) | | | |
| transform_size_8x8_flag | 2 | u(1) \| ae(v) | |
| } | | | |
| if( CodedBlockPatternLuma > 0 \|\| CodedBlockPatternChroma > 0 \|\| <br> MbPartPredMode( mb_type, 0 ) == Intra_16x16 ) { | | | |
| mb_qp_delta | 2 | se(v) \| ae(v) | |
| residual( 0, 15 ) | 3 \| 4 | | |
| } | | | |
| } | | | |
| } | | | |

FIG. 27

Sub-macroblock prediction syntax

| sub_mb_pred( mb_type ) { | C | Descriptor |
|---|---|---|
| for( mbPartIdx = 0; mbPartIdx < 4; mbPartIdx++ ) | | |
|     sub_mb_type[ mbPartIdx ] | 2 | ue(v) \| ae(v) |
| for( mbPartIdx = 0; mbPartIdx < 4; mbPartIdx++ ) | | |
|     if( ( num_ref_idx_l0_active_minus1 > 0 \|\| <br>      mb_field_decoding_flag != field_pic_flag ) && <br>      mb_type != P_8x8ref0 && <br>      sub_mb_type[ mbPartIdx ] != B_Direct_8x8 && <br>      SubMbPredMode( sub_mb_type[ mbPartIdx ] ) != Pred_L1 ) | | |
|     ref_idx_l0[ mbPartIdx ] | 2 | te(v) \| ae(v) |
| for( mbPartIdx = 0; mbPartIdx < 4; mbPartIdx++ ) | | |
|     if( ( num_ref_idx_l1_active_minus1 > 0 \|\| <br>      mb_field_decoding_flag != field_pic_flag ) && <br>      sub_mb_type[ mbPartIdx ] != B_Direct_8x8 && <br>      SubMbPredMode( sub_mb_type[ mbPartIdx ] ) != Pred_L0 ) | | |
|     ref_idx_l1[ mbPartIdx ] | 2 | te(v) \| ae(v) |
| for( mbPartIdx = 0; mbPartIdx < 4; mbPartIdx++ ) | | |
|     if( sub_mb_type[ mbPartIdx ] != B_Direct_8x8 && <br>      SubMbPredMode( sub_mb_type[ mbPartIdx ] ) != Pred_L1 ) | | |
|       for( subMbPartIdx = 0; <br>        subMbPartIdx < NumSubMbPart( sub_mb_type[ mbPartIdx ] ); <br>        subMbPartIdx++) | | |
|         for( compIdx = 0; compIdx < 2; compIdx++ ) | | |
|           mvd_l0[ mbPartIdx ][ subMbPartIdx ][ compIdx ] | 2 | se(v) \| ae(v) |
| for( mbPartIdx = 0; mbPartIdx < 4; mbPartIdx++ ) | | |
|     if( sub_mb_type[ mbPartIdx ] != B_Direct_8x8 && <br>      SubMbPredMode( sub_mb_type[ mbPartIdx ] ) != Pred_L0 ) | | |
|       for( subMbPartIdx = 0; <br>        subMbPartIdx < NumSubMbPart( sub_mb_type[ mbPartIdx ] ); <br>        subMbPartIdx++) | | |
|         for( compIdx = 0; compIdx < 2; compIdx++ ) | | |
|           mvd_l1[ mbPartIdx ][ subMbPartIdx ][ compIdx ] | 2 | se(v) \| ae(v) |
| } | | |

FRf

FIG. 28

Macroblock prediction syntax

| mb_pred( mb_type ) { | C | Descriptor |
|---|---|---|
|   if( MbPartPredMode( mb_type, 0 ) == Intra_4x4 \|\| <br>    MbPartPredMode( mb_type, 0 ) == Intra_8x8 \|\| <br>    MbPartPredMode( mb_type, 0 ) == Intra_16x16 ) { | | |
|     if( MbPartPredMode( mb_type, 0 ) == Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |
|     if( MbPartPredMode( mb_type, 0 ) == Intra_8x8 ) | | |
|       for( luma8x8BlkIdx=0; luma8x8BlkIdx<4; luma8x8BlkIdx++ ) { | | |
|         prev_intra8x8_pred_mode_flag[ luma8x8BlkIdx ] | 2 | u(1) \| ae(v) |
|         if( !prev_intra8x8_pred_mode_flag[ luma8x8BlkIdx ] ) | | |
|           rem_intra8x8_pred_mode[ luma8x8BlkIdx ] | 2 | u(3) \| ae(v) |
|       } | | |
|     if( ChromaArrayType == 1 \|\| ChromaArrayType == 2 ) | | |
|       intra_chroma_pred_mode | 2 | ue(v) \| ae(v) |
|   } else if( MbPartPredMode( mb_type, 0 ) != Direct ) { | | |
|     for( mbPartIdx = 0; mbPartIdx < NumMbPart( mb_type ); mbPartIdx++) | | |
|       if( ( num_ref_idx_l0_active_minus1 > 0 \|\| <br>        mb_field_decoding_flag != field_pic_flag ) && <br>        MbPartPredMode( mb_type, mbPartIdx ) != Pred_L1 ) | | |
|         ref_idx_l0[ mbPartIdx ] | 2 | te(v) \| ae(v) |
|     for( mbPartIdx = 0; mbPartIdx < NumMbPart( mb_type ); mbPartIdx++) | | |
|       if( ( num_ref_idx_l1_active_minus1 > 0 \|\| <br>        mb_field_decoding_flag != field_pic_flag ) && <br>        MbPartPredMode( mb_type, mbPartIdx ) != Pred_L0 ) | | |
|         ref_idx_l1[ mbPartIdx ] | 2 | te(v) \| ae(v) |
|     for( mbPartIdx = 0; mbPartIdx < NumMbPart( mb_type ); mbPartIdx++) | | |
|       if( MbPartPredMode ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v) \| ae(v) |
|   } | | |
| } | | |

FRg (ref_idx_l0 row)
FRh (ref_idx_l1 row)

FIG. 29

Prediction unit syntax

| prediction_unit( x0, y0, nPbW, nPbH ) { | Descriptor |
|---|---|
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

FRj

FIG. 31
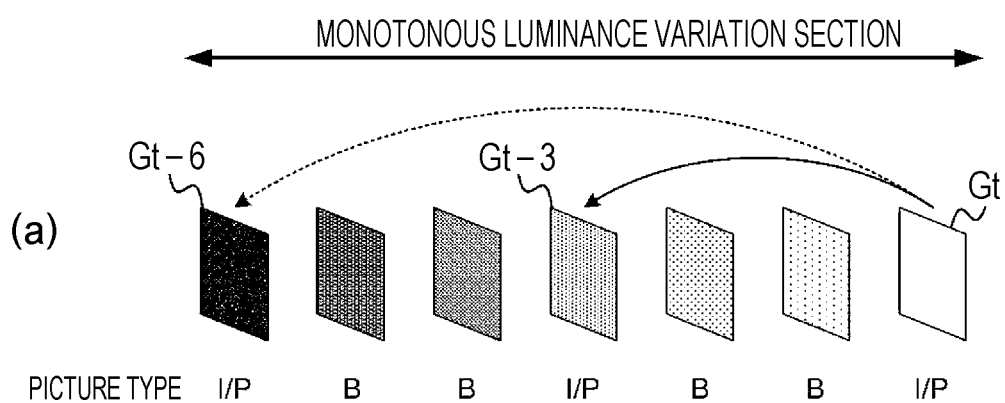
(a)
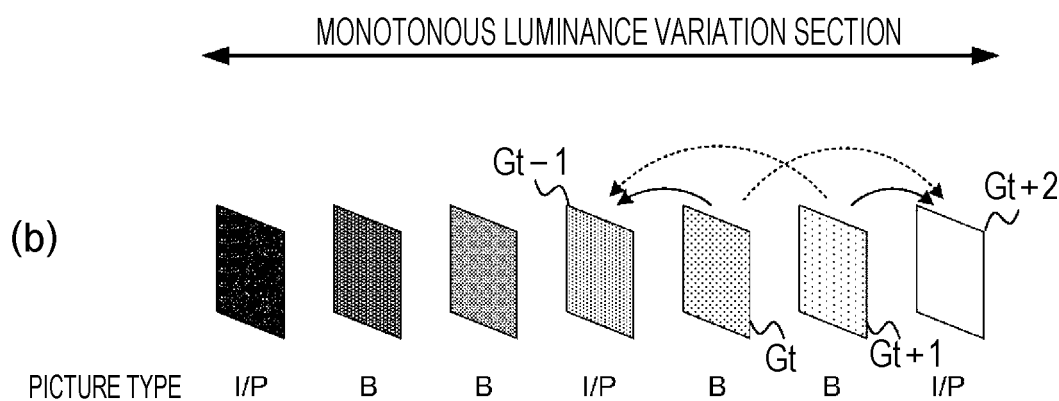
(b)

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2018/037725 (filed on Oct. 10, 2018) under 35 U.S.C. § 371, which claims priority to Japanese Patent Application No. 2017-216209 (filed on Nov. 9, 2017), which are all hereby incorporated by reference in their entirety.

TECHNICAL FIELD

The present technology relates to an image processing apparatus and an image processing method, and enables efficient encoding while suppressing deterioration in image quality of a decoded image.

BACKGROUND ART

Conventionally, an image processing apparatus that generates an encoded stream of moving image data has been widely used in order to efficiently transmit or record a moving image. In encoding of moving image data, motion prediction and motion compensation based on a motion vector are performed. In Patent Document 1, it is described that a fade section that is originally difficult to be detected through motion prediction based on a motion vector is detected and that weighted prediction is performed in a Ford section.

CITATION LIST

Patent Document

Patent Document 1: Japanese Patent Application Laid-Open No. 2008-005145

SUMMARY OF THE INVENTION

Problems to be Solved by the Invention

By the way, in a case of detecting a fade section and performing weighted prediction, sufficient performance cannot be achieved with the weighted prediction if weighting factors and offset values are not set appropriately. Thus, there is a possibility of degradation in image quality.

Also, for example, in a case where a reference direction is limited for bidirectional predicted images in order to reduce a bandwidth required for transmission of an encoded stream and the like, there is a possibility that image quality is deteriorated or encoding efficiency is reduced unless the reference direction used for prediction is appropriate.

Therefore, the present technology provides an image processing apparatus and an image processing method that can perform efficient encoding while suppressing degradation in image quality of a decoded image.

Solutions to Problems

A first aspect of the present technology is an image processing apparatus including
a reference direction determination unit that adaptively selects, for a picture of an image included in a luminance variation section, a reference direction of temporal direction prediction in image encoding processing for each block in the picture included in the luminance variation section.

In the present technology, the reference direction determination unit uniformly fixes the reference direction of the temporal direction prediction in the encoding processing of an input image in the picture or adaptively selects it for each block in the picture on the basis of the input image. For example, in a case of the luminance variation section including a picture of an image corresponding to a scene change or flash, the reference direction determination unit adaptively selects the reference direction only for the picture of the image included in the luminance variation section for each block in the picture. Further, in a case of a monotonous luminance variation section detected on the basis of a luminance average value in the picture, the reference direction determination unit uniformly fixes the reference direction for a picture of an image included in the monotonous luminance variation section in the picture. Further, the reference direction determination unit detects an occlusion area using the input image, and adaptively selects the reference direction for each block in the detected occlusion area.

Moreover, a sample adaptive offset mode candidate selection unit uses a band offset as a sample adaptive offset processing candidate for a decoded image generated using a predicted image and a restored difference image in the monotonous luminance variation section. In addition, an orthogonal transformation mode candidate selection unit sets orthogonal transformation processing for a difference image between the input image and the predicted image to an orthogonal transformation mode suitable for uniform luminance change in the monotonous luminance variation section. In addition, an information change processing unit changes an index value in a reference direction used for prediction to an index value with a small code amount, in a case where there is a plurality of indexes in a reference image list in the monotonous luminance variation section.

In addition, the reference direction determination unit is processing of either uniformly fixing in the picture or adaptively selecting for each block in the picture, for a picture of an image not included in the luminance variation section and the monotonous luminance variation section. Moreover, the reference direction determination unit, detects a picture of an image included in the luminance variation section on the basis of imaging control information.

The reference direction determination unit fixes a reference plane in any one of an L0 direction, an L1 direction, or both of the L0 direction and the L1 direction in a case where the reference direction is fixed uniformly in the picture. Further, the reference direction determination unit selects the reference plane to be fixed on the basis of a temporal positional relationship. For example, the reference direction determination unit selects a reference plane with a short reference distance. Further, the reference direction determination unit may select the reference plane on the basis of the temporal positional relationship and a hierarchical relationship. For example, the reference direction determination unit selects a reference plane in a shallower level of a hierarchy whose image quality is better than that of a reference plane in a deeper level of the hierarchy. Moreover, the reference direction determination unit determines the reference direction according to a characteristic of the input, image in a case where the reference direction is fixed uniformly in the picture. For example, the reference direction determination unit selects a direction of an image having a luminance characteristic closer to that of an encoding target image as the reference direction.

A second aspect of the present technology is an image processing method including adaptively selecting, for a picture of an image included in a luminance variation section, a reference direction of temporal direction prediction in image encoding processing for each block in the picture included in the luminance variation section by a reference direction determination unit.

Effects of the Invention

According to the present technology, for a picture of an image included in a luminance variation section, a reference direction of temporal direction prediction in image encoding processing is adaptively selected for each block in the picture included in the luminance variation section by the reference direction determination unit. Therefore, the reference direction of the temporal direction prediction is set to an appropriate direction, and encoding can be performed efficiently while suppressing deterioration in image quality of a decoded image. Note that the effects described in the present specification are merely examples and are not limited, and may have additional effects.

BRIEF DESCRIPTION OF DRAWINGS

FIG. 12 is a diagram showing "Sample adaptive offset syntax".

FIG. 13 is a diagram illustrating a second operation.

FIG. 17 is a diagram showing "Reference picture list modification syntax".

FIG. 18 is a diagram showing a reference image list in a case of an interlaced image.

FIG. 25 is a diagram exemplifying a configuration of a reference direction determination unit in a case where a reference direction is determined on the basis of imaging control information.

FIG. 26 is a diagram showing "Macroblock layer syntax".

FIG. 27 is a diagram showing "Sub-macroblock prediction syntax".

FIG. 28 is a diagram showing "Macroblock prediction syntax".

FIG. 29 is a diagram showing "Prediction unit syntax".

FIG. 31 is a diagram for describing a second operation.

MODES FOR CARRYING OUT THE INVENTION

In the present technology, a reference direction is restricted in temporal direction prediction in image encoding processing by selecting either a method for uniformly fixing a reference direction in a picture (also referred to as in a screen) (hereinafter referred to as "fixed reference direction mode") or a method for adaptively switching a reference direction in a picture for each block (hereinafter referred to as "reference direction adaptive selection mode") on the basis of an input image. Thus, by selecting either one of the modes according to the input image, it is possible to efficiently perform encoding while suppressing deterioration of image quality of a decoded image.

Figure 1:
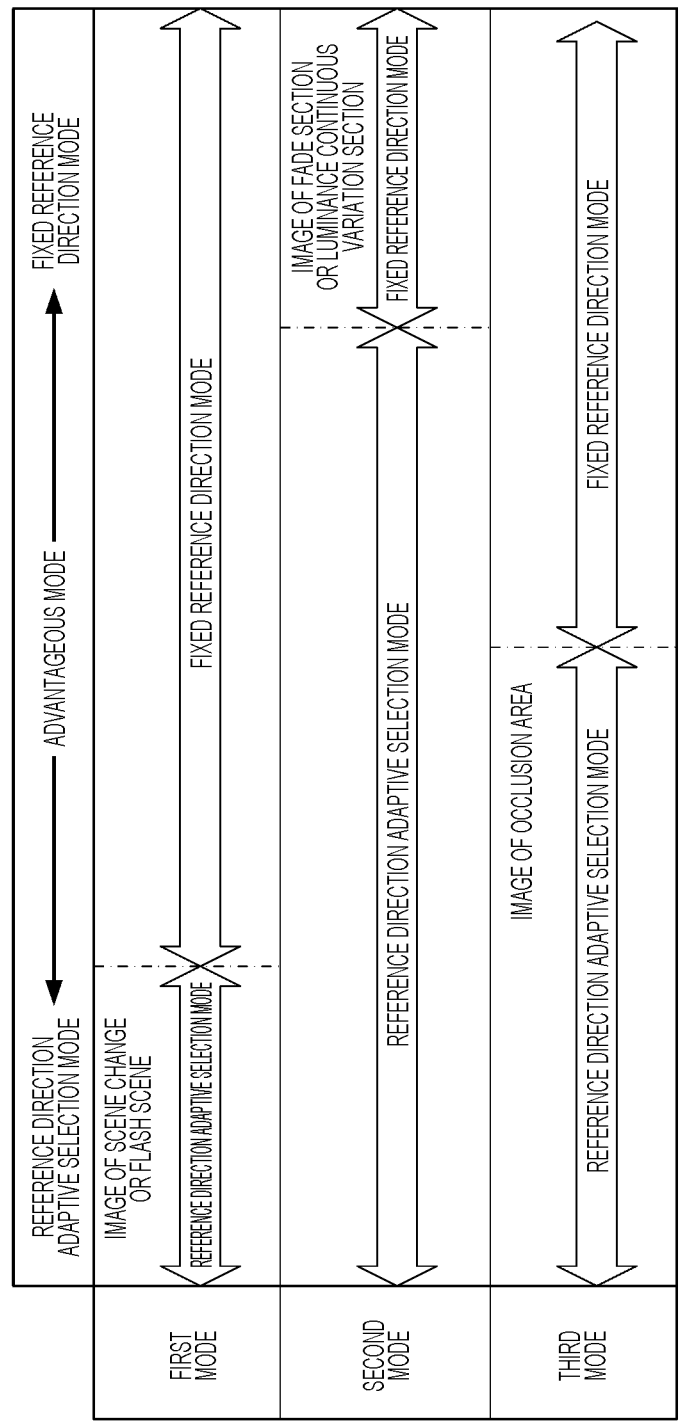
FIG. 1 is a diagram for describing features of the present technology.

FIG. 1 is a diagram for describing features of the present technology. In a case where an encoding target image (a frame image or a field image) is an image corresponding to a luminance variation section, for example, a scene change or flash (a flash scene), a reference direction in a picture is fixed to the same one direction, image quality of a decoded image is deteriorated and encoding efficiency is reduced in a case where a reference image is an image before the scene change or before the flash scene. Therefore, as shown in a first mode, an image processing apparatus selects a reference direction adaptive selection mode and performs encoding processing for a picture of an input image included in the luminance variation section.

In addition, in a case where the encoding target image is, for example, a fade section or a section where luminance of an entire screen monotonously increases or monotonously decreases (also referred to as a monotonous luminance variation section) due to exposure control, if the reference direction is different in a picture, there is a case where luminance variation according to the difference in the reference direction occurs in a decoded image and image quality is deteriorated. Therefore, as shown in a second mode, the image processing apparatus selects a fixed reference direction mode and performs encoding processing for a picture of an image included in the monotonous luminance variation section.

Moreover, if an occlusion area is included in a picture and a reference direction in the picture is fixed to the same one direction, deterioration of image quality of a decoded image and a decrease in encoding efficiency occur in a case where the occlusion area is not included in a reference image. Therefore, as shown in a third mode, in a case where a block of the encoding target image is the occlusion area, the image processing apparatus selects the reference direction adaptive selection mode and performs encoding processing. Note that the mode selection is not limited to the first to third modes, and an operation of selecting the reference direction adaptive selection mode in a case of emphasizing a natural feeling of motion, r selecting the fixed reference direction mode in a case of emphasizing a sense of stability of image quality in a picture, or the like may be performed.

The scope disclosed in the present technology includes not only the contents described in the modes for carrying out the invention but also the contents described in the following documents 1 to 5 that are publicly known (note that in the following description, a standard shown in documents 1 and 2 is also called "AVC standard", and a standard shown in documents 3 and 4 is also called "HEVC standard").

Document 1: ITU-T Rec. H.264: "Advanced video coding for generic audiovisual services"

Document 2: ISO/IEC 14496-10: "Advanced Video Coding"

Document 3: ITU-T Rec. H.265: "High Efficiency Video Coding"

Document 4: ISO/IEC 23008-2: "High Efficiency Video Coding"

Document 5: Joint Video Exploration Team (JVET) of ITU-T SG 16 WP 3 and ISO/IEC JTC 1/SC 29/WG 11 7th Meeting: Torino, IT, 13-21 Jul. 2017: JVET-G1001-v1 "Algorithm Description of Joint Exploration Test Model 7"

Hereinafter, modes for carrying out the present technology will be described. Note that the description will be given in the following order.

Figure 2:
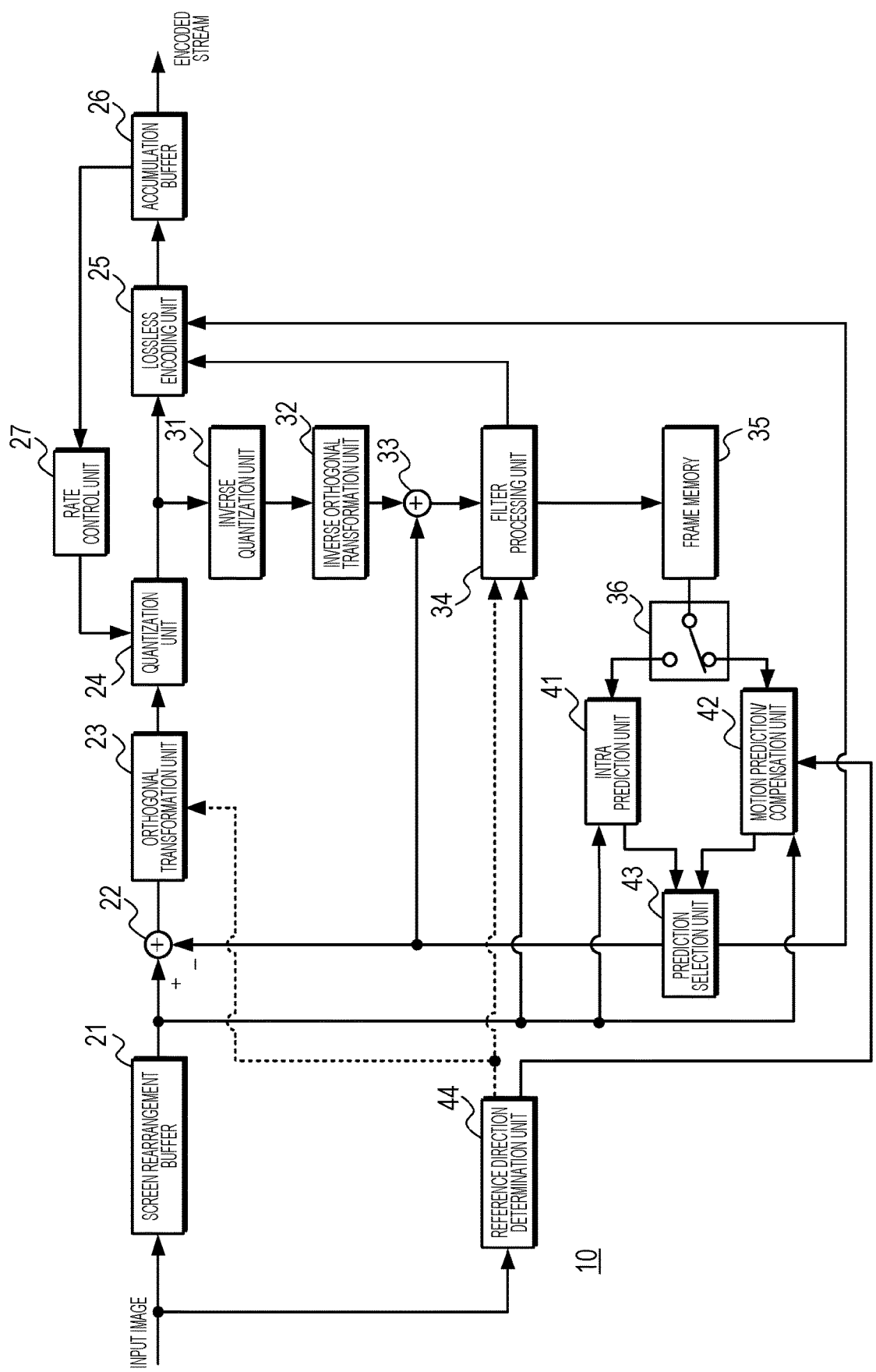
FIG. 2 is a diagram illustrating a configuration of an image processing apparatus.

1-1. Configuration of image processing apparatus
1-2. Operation of image processing apparatus
2. First mode
3. Second mode
3-1. First operation in second mode
3-2. Second operation in second mode
3-3. Third operation in second mode
3-4. Fourth operation in second mode
4. Combination of first mode and second mode
5. Third mode
6. Other modes
7. Operation in fixed reference direction mode
7-1. First operation in fixed reference direction mode
7-2. Second operation in fixed reference direction mode
7-3. Third operation in fixed reference direction mode 1-1. Configuration of Image Processing Apparatus FIG. 2 illustrates a configuration of an image processing apparatus. An image processing apparatus 10 includes a screen rearrangement buffer 21, an arithmetic unit 22, an orthogonal transformation unit 23, a quantization unit 24, a lossless encoding unit 25, an accumulation buffer 26, and a rate control unit 27. Further, the image processing apparatus 10 includes an inverse quantization unit 31, an inverse orthogonal transformation unit 32, an arithmetic unit 33, a filter processing unit 34, a frame memory 35, and a selection unit 36. Moreover, the image processing apparatus 10 includes an intra prediction unit 41, a motion prediction/compensation unit 42, a prediction selection unit 43, and a reference direction determination unit 44.

The screen rearrangement buffer 21 rearranges stored frame images in a display order into an order for encoding (encoding order) according to a group of picture (GOP) structure. The screen rearrangement buffer 21 outputs data of the frame images (original image data) arranged in the encoding order to the arithmetic unit 22. Further, the screen rearrangement buffer 21 outputs the original image data to the filter processing unit 34, the intra prediction unit 41, and the motion prediction/compensation unit 42.

The arithmetic unit 22 subtracts, for each pixel, predicted image data supplied from the intra prediction unit 41 or the motion prediction/compensation unit 42 via the prediction selection unit 43 from the original image data supplied from the screen rearrangement buffer 21, and then outputs residual data indicating a prediction residual to the orthogonal transformation unit 23.

For example, in a case of an image on which intra coding is performed, the arithmetic unit 22 subtracts the predicted image data generated by the intra prediction unit 41 from the original image data. Further, for example, in a case of an image on which inter coding is performed, the arithmetic unit 22 subtracts the predicted image data generated by the motion prediction/compensation unit 42 from the original image data.

The orthogonal transformation unit 23 performs orthogonal transformation processing for performing orthogonal transformation such as discrete cosine transform on the residual data supplied from the arithmetic unit 22. The orthogonal transformation unit 23 outputs a transformation coefficient obtained by performing the orthogonal transformation processing to the quantization unit 24. Further, in a case where a mode used for processing can be selected from a plurality of orthogonal transformation modes, the orthogonal transformation unit 23 selects an orthogonal transformation mode candidate according to a determination result of the reference direction determination unit 44.

The quantization unit 24 quantizes the transformation coefficient output from the orthogonal transformation unit 23. The quantization unit 24 outputs quantized data of the transformation coefficient to the lossless encoding unit 25. Further, the quantization unit 24 also outputs the generated quantized data to the inverse quantization unit 31.

The lossless encoding unit 25 performs entropy encoding processing such as lossless encoding, for example, context-adaptive binary arithmetic coding (CABAC), etc. on the quantized data. Further, the lossless encoding unit 25 acquires a parameter of a prediction mode selected by the prediction selection unit 43, for example, a parameter such as information indicating an intra prediction mode, or a parameter such as information indicating an inter prediction mode and motion vector information. Moreover, the lossless encoding unit 25 acquires a parameter regarding filter processing from the filter processing unit 34. The lossless encoding unit 25 encodes the quantized data and encodes each of the acquired parameters (syntax elements), thereby accumulating (by multiplexing) them in the accumulation buffer 26 as a part of header information.

The accumulation buffer 26 temporarily holds the data supplied from the lossless encoding unit 25 and outputs it as an encoded stream at a predetermined timing, for example, to a recording device, transmission path (not shown) at a later stage, or the like.

The rate control unit 27 controls a quantization operation rate of the quantization unit 24 on the basis of an amount of data accumulated in the accumulation buffer 26 so that overflow or underflow does not occur.

The inverse quantization unit 31 performs inverse quantization on the quantized data of the transformation coefficient supplied from the quantization unit 24 by a method corresponding to the quantization performed by the quantization unit 24. The inverse quantization unit 31 outputs the obtained inversely quantized data to the inverse orthogonal transformation unit 32.

The inverse orthogonal transformation unit 32 performs inverse orthogonal transformation on the supplied inversely quantized data by a method corresponding to the orthogonal transformation processing performed by the orthogonal transformation unit 23. The inverse orthogonal transformation unit 32 outputs a result of the inverse orthogonal transformation, that is, restored residual data to the arithmetic unit 33.

The arithmetic unit 33 adds the predicted image data supplied from the intra prediction unit 41 or the motion prediction/compensation unit 42 via the prediction selection unit 43 to the residual data supplied from the inverse orthogonal transformation unit 32, and obtains a locally decoded image (decoded image). For example, in a case where the residual data corresponds to an image on which intra coding is performed, the arithmetic unit 33 adds the predicted image data supplied from the intra prediction unit 41 to the residual data. Further, for example, in a case where the residual data corresponds to an image on which inter coding is performed, the arithmetic unit 33 adds the predicted image data supplied from the motion prediction/compensation unit 42 to the residual data. Decoded image data as an addition result is output to the filter processing unit 34.

The filter processing unit 34 is configured using at least any one of a bilateral filter, a deblocking filter, an adaptive offset filter, or an adaptive loop filter. The filter processing unit 34 outputs the decoded image data after the filter processing to the frame memory 35. Further, in a case where a plurality of processing can be performed in the filter processing, the filter processing unit 34 selects a filter processing candidate according to a determination result of the reference direction determination unit 44. The filter processing unit 34 outputs information regarding the filter processing of the decoded image data to the lossless encoding unit 25 as a parameter. Note that the filter processing unit 34 also has a function of invalidating the filter processing and outputting the decoded image data supplied from the arithmetic unit 33 to the frame memory 35.

Reference image data accumulated in the frame memory 35 is output to the intra prediction unit 41 or the motion prediction/compensation unit 42 via the selection unit 36 at a predetermined timing. For example, in a case of an image on which intra coding is performed, reference image data is read from the frame memory 35 and output to the intra prediction unit 41 via the selection unit 36. Further, for example, in a case where inter coding is performed, reference image data is read from the frame memory 35 and output to the motion prediction/compensation unit 42 via the selection unit 36.

The intra prediction unit 41 performs intra prediction (in-screen prediction) that generates a predicted image using pixel values in a screen. The intra prediction unit 41 generates predicted image data for every intra prediction mode by using the decoded image data generated by the arithmetic unit 33 and stored in the frame memory 35 as reference image data. Further, the intra prediction unit 41 uses the original image data supplied from the screen rearrangement buffer 21 and the predicted image data to calculate a cost (for example, a rate distortion cost) of each intra prediction mode, etc., and selects an optimal mode in which the calculated cost is a minimum. After selecting the optimal intra prediction mode, the intra prediction unit 41 outputs predicted image data of the selected intra prediction mode, parameters such as intra prediction mode information indicating the selected intra prediction mode, the cost, and the like to the prediction selection unit 43.

The motion prediction/compensation unit 42 performs inter prediction (temporal direction prediction) on an image on which inter coding is performed by using the original image data supplied from the screen rearrangement buffer 21 and the decoded image data subjected to the filter processing and stored in the frame memory 35 as reference image data. Further, the motion prediction/compensation unit 42 performs motion prediction using reference image data in a reference direction determined by the reference direction determination unit 44. Moreover, the motion prediction/compensation unit 42 performs motion compensation processing according to a motion vector detected by the motion prediction, and generates predicted image data.

The motion prediction/compensation unit 42 performs prediction processing in all inter prediction modes, generates predicted image data for each inter prediction mode to calculate a cost (e.g., a rate distortion cost) etc., and selects an optimal mode in which the calculated cost is a minimum. After selecting the optimal inter prediction mode, the motion prediction/compensation unit 42 outputs predicted image data of the selected inter prediction mode, parameters such as inter prediction mode information indicating the employed inter prediction mode and motion vector information indicating the calculated motion vector, the cost, and the like to the prediction selection unit 43.

The prediction selection unit 43 selects optimal prediction processing on the basis of the costs of the intra prediction mode and the inter prediction mode. In a case where intro prediction processing is selected, the prediction selection unit 43 outputs the predicted image data supplied from the intra prediction unit 41 to the arithmetic unit 22 and the arithmetic unit 33, and outputs the parameters such as the intra prediction mode information to the lossless encoding unit 25. In a case where inter prediction processing is selected, the prediction selection unit 43 outputs the predicted image data supplied from the motion prediction/compensation unit 42 to the arithmetic unit 22 and the arithmetic unit 33, and outputs the parameters such as the inter prediction mode information and the motion vector information to the lossless encoding unit 25.

The reference direction determination unit 44 detects a scene change/flash scene or a monotonous luminance variation section as detection of a predetermined change in the input image, and determines a reference direction on the basis of a detection result as shown in FIG. 1. In other words, in a case where an encoding target image is the scene change or flash scene, the reference direction determination unit 44 makes the motion prediction/compensation unit 42 perform inter prediction in a reference direction adaptive selection mode. Further, in a case where an encoding target image is the monotonous luminance variation section, the reference direction determination unit 44 makes the motion prediction/compensation unit 42 perform inter prediction in a fixed reference direction mode. Moreover, the reference direction determination unit 44 controls operations of the orthogonal transformation unit 23 and the filter processing unit 34 according to a detection result of the monotonous luminance variation section.

1-2. Operation of Image Processing Apparatus

Figure 3:
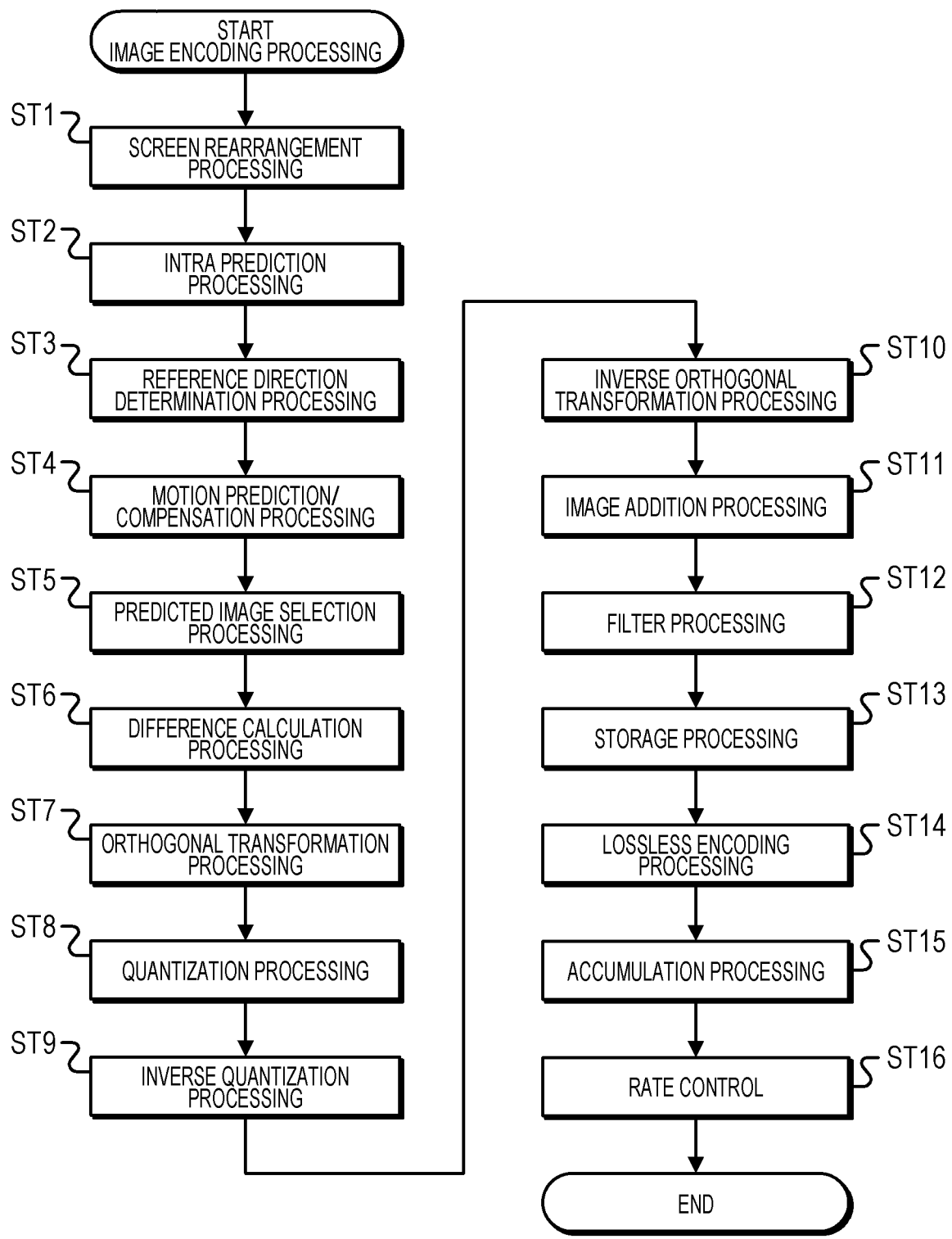
FIG. 3 is a flowchart illustrating an operation of the image processing apparatus.

Next, an operation of the image processing apparatus will be described. FIG. 3 is a flowchart illustrating the operation of the image processing apparatus.

In step ST1, the image processing apparatus performs screen rearrangement processing. The screen rearrangement buffer 21 of the image processing apparatus 10 rearranges frame images in a display order into an encoding order, and outputs them to the intra prediction unit 41 and the motion prediction/compensation unit 42.

In step ST2, the image processing apparatus performs intra prediction processing. The intra prediction unit 41 of the image processing apparatus 10 uses reference image data read from the frame memory 35 to generate predicted image data by performing intra prediction on pixels of a processing target block in all candidate intra prediction modes. Further, the intra prediction unit 41 calculates a cost using the generated predicted image data and original image data. Note that decoded image data stored in the frame memory 35 after filter processing of the filter processing unit 34 is invalidated is used as the reference image data. The intra prediction unit 41 selects an optimal intra prediction mode on the basis of the calculated cost, and outputs predicted image data generated by intra prediction in the optimal intra prediction mode, parameters, and the cost to the prediction selection unit 43.

In step ST3, the image processing apparatus performs reference direction determination processing. The reference direction determination unit 41 of the image processing apparatus 10 determines whether an encoding target image is an image suitable for a reference direction adaptive selection mode from an image suitable for a fixed reference direction mode using an input image.

In step ST4, the image processing apparatus performs motion prediction/compensation processing. The motion prediction/compensation unit 42 of the image processing apparatus 10 performs motion prediction using the original image data and decoded image data after filter processing stored in the frame memory 35 as reference image data. In addition, the motion prediction/compensation unit 42 performs motion prediction using reference image data selected in a mode corresponding to a determination result in step ST3. Moreover, the motion prediction/compensation unit 42 performs motion compensation processing according to a mot ion vector detected by the motion prediction, and generates predicted image data for each inter prediction mode. In addition, the motion prediction/compensation unit 42 calculates a cost using the generated predicted image data and the original image data. The motion prediction/compensation unit 42 determines an optimal inter prediction mode on the basis of the calculated cost.

In step ST5, the image processing apparatus performs predicted image selection processing. The prediction selection unit 43 of the image processing apparatus 10 determines one of the optimal intra prediction mode and the optimal inter prediction mode as an optimal prediction mode on the basis of the costs calculated in step ST2 and step ST4. Then, the prediction selection unit 43 selects predicted image data in the determined optimal prediction mode and outputs it to the arithmetic units 22 and 33. Note that the predicted image data is used for calculations in steps ST6 and ST11 described later. Further, the prediction selection unit 43 outputs parameters regarding the optimal prediction mode to the lossless encoding unit 25.

In step ST6, the image processing apparatus performs difference calculation processing. The arithmetic unit 22 of the image processing apparatus 10 calculates a difference between the original image data rearranged in step ST1 and the predicted image data selected in step ST5, and outputs residual data, which is a difference result, to the orthogonal transformation unit 23.

In step ST7, the image processing apparatus performs orthogonal transformation processing. The orthogonal transformation unit 23 of the image processing apparatus 10 performs orthogonal transformation on the residual data supplied from the arithmetic unit 22. Specifically, orthogonal transformation such as discrete cosine transform is performed, and an obtained transformation coefficient is output to the quantization unit 24.

In step ST8, the image processing apparatus performs quantization processing. The quantization unit 24 of the image processing apparatus 10 quantizes the transformation coefficient or residual data supplied from the orthogonal transformation unit 23. At the time of this quantization, a rate is controlled as described in processing of step ST16 described later.

Quantization information generated as described above is locally decoded as follows. In other words, in step ST9, the image processing apparatus performs inverse quantization processing. The inverse quantization unit 31 of the image processing apparatus 10 inversely quantizes the quantized data output from the quantization unit 24 with a characteristic corresponding to the quantization unit 24.

In step ST10, the image processing apparatus performs inverse orthogonal transformation processing. The inverse orthogonal transformation unit 32 of the image processing apparatus 10 performs inverse orthogonal transformation on the inversely quantized data generated by the inverse quantization unit 31 with a characteristic corresponding to the orthogonal transformation unit 23 to generate residual data, and then outputs it to the arithmetic unit 33.

In step ST11, the image processing apparatus performs image addition processing. The arithmetic unit 33 of the image processing apparatus 10 adds the predicted image data output from the prediction selection unit 43 to locally decoded residual data, and generates a locally decoded (that is, local decoded) image.

In step ST12, the image processing apparatus performs filter processing. The filter processing unit 34 of the image processing apparatus 10 performs at least any one of bilateral filter processing, deblocking filter processing, adaptive offset filter processing, or adaptive loop filter processing using the decoded image data output from the arithmetic unit 33. Further, the filter processing unit 31 has a function of invalidating the filter processing.

In step ST13, the image processing apparatus performs storage processing. The frame memory 35 of the image processing apparatus 10 stores the decoded image data subjected to the filter processing by the filter processing unit 34 and the decoded image data before the filter processing (decoded image data in which the filter processing is invalidated).

On the other hand, the transformation coefficient or residual data quantized in step ST8 described above is also output to the lossless encoding unit 25. In step ST14, the image processing apparatus performs lossless encoding processing. The lossless encoding unit 25 of the image processing apparatus 10 encodes the quantized transformation coefficient or quantized residual data output from the quantization unit 24 and each of the supplied parameters.

In step ST15, the image processing apparatus performs accumulation processing. The accumulation buffer 26 of the image processing apparatus 10 accumulates coded data. The coded data accumulated in the accumulation buffer 26 is appropriately read and transmitted to a decoding side via a transmission path or the like.

In step ST16, the image processing apparatus performs rate control. The rate control unit 27 of the image processing apparatus 10 controls a quantization operation rate of the quantization unit 24 so that the coded data accumulated in the accumulation buffer 26 does not overflow or underfloor.

2. First Mode

Next, a first mode shown in FIG. 1 will be described. In the first mode, encoding processing is performed by selecting a fixed reference direction mode or a reference direction adaptive selection mode according to a detection result of a scene change or a flash scene.

Figure 4:
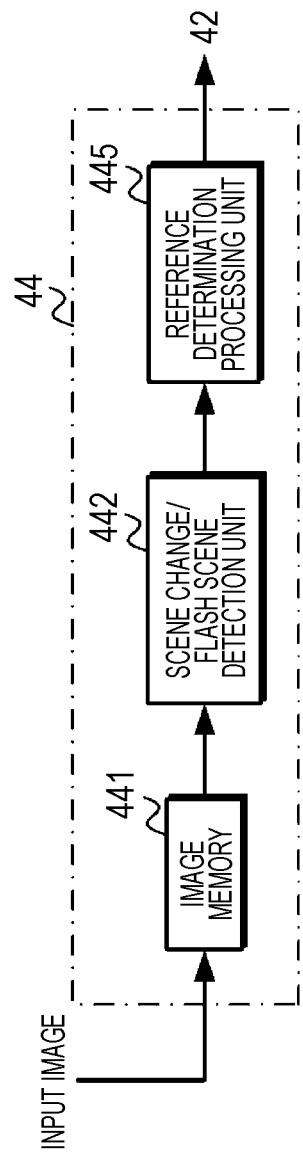
FIG. 4 is a diagram illustrating a configuration of a reference direction determination unit in a first mode.

FIG. 4 illustrates a configuration of a reference direction determination unit in the first mode. A reference direction determination unit 44 includes an image memory 441, a scene change/flash scene detection unit 442, and a reference determination processing unit 445.

The image memory 441 stores an input image. Further, the image memory 441 outputs the stored input image to the scene change/flash scene detection unit 442.

The scene change/flash scene detection unit 442 detects a scene change or a flash scene on the basis of the input image stored in the image memory 441. The scene change/flash scene detection unit 442 detects a scene change or a flash scene on the basis of changes in luminance and frequency components between frames. For example, the scene change/flash scene detection unit 442 calculates luminance dispersion in a screen for each frame, and in a case where an amount of change in the luminance dispersion between the frames is larger than a preset threshold value, it is determined that a scene change or a flash scene has been detected. Also, for example, the scene change/flash scene detection unit 442 may calculate an in-screen average of Hadamard values calculated in units of blocks for each frame, and in a case where an amount of change in the in-screen average between the frames is larger than a preset threshold value, it is determined that a scene change or a flash scene has been detected. Moreover, the scene change/flash scene detection unit 442 may detect a scene change or a flash scene on the basis of the amount of change in the luminance dispersion between the frames and the amount of change in the in-screen average of the Hadamard values between the frames. The scene change/flash scene detection unit 442 outputs a detection result of the scene change or flash scene to the reference determination processing unit 445.

The reference determination processing unit 445 determines which one of the fixed reference direction mode or the reference direction adaptive selection mode to be used in temporal direction prediction on the basis of the detection result of the scene change or the flash scene. The reference determination processing unit 445 selects the reference direction adaptive selection mode in a case where the scene change or flash scene has been detected, selects the fixed reference direction mode in a case where no scene change or flash scene has been detected, and outputs a selection result to the motion prediction/compensation unit 42.

Figure 5:
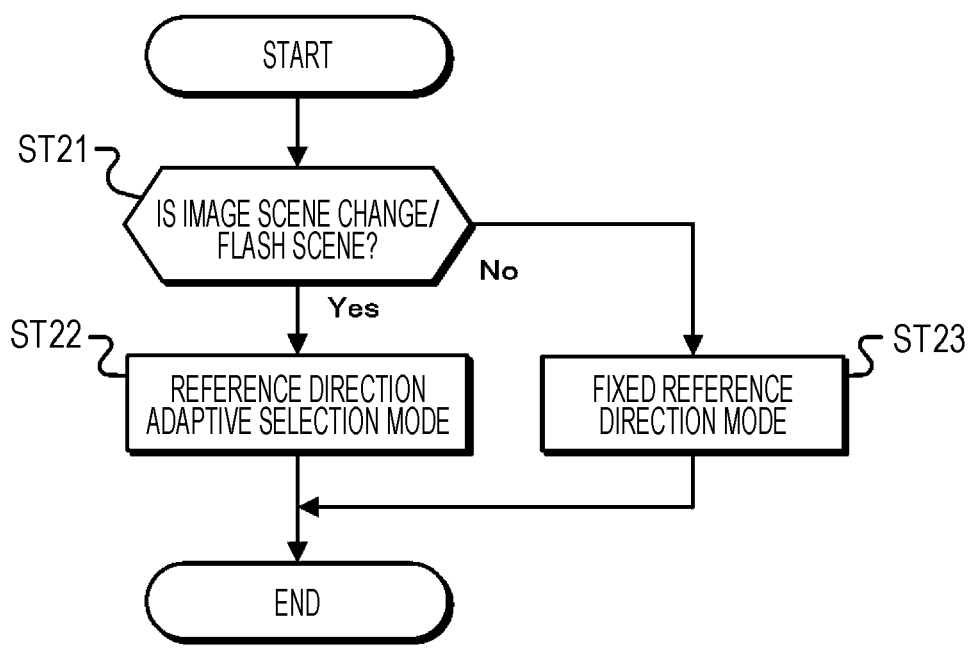
FIG. 5 is a flowchart illustrating an operation of the reference direction determination unit in the first mode.

FIG. 5 is a flowchart illustrating an operation of the reference direction determination unit in the first mode. In step ST21, the reference direction determination unit determines whether it is a scene chance or a flash scene. In a case where the reference direction determination unit 44 proceeds to step ST22 in a case where it is determined that an encoding target image is a scene change or a flash scene, and proceeds to step ST23 in a case where it is not determined that it is the scene change or flash scene.

In step ST22, the reference direction determination unit selects the reference direction adaptive selection mode. The reference direction determination unit 44 makes the motion prediction/compensation unit 42 use the reference direction adaptive selection mode when performing inter prediction on the encoding target image.

In step ST23, the reference direction determination unit selects the fixed reference direction mode. The reference direction determination unit 44 makes the motion prediction/compensation unit 42 use the fixed reference direction mode when performing inter prediction on the encoding target image.

Figure 6:
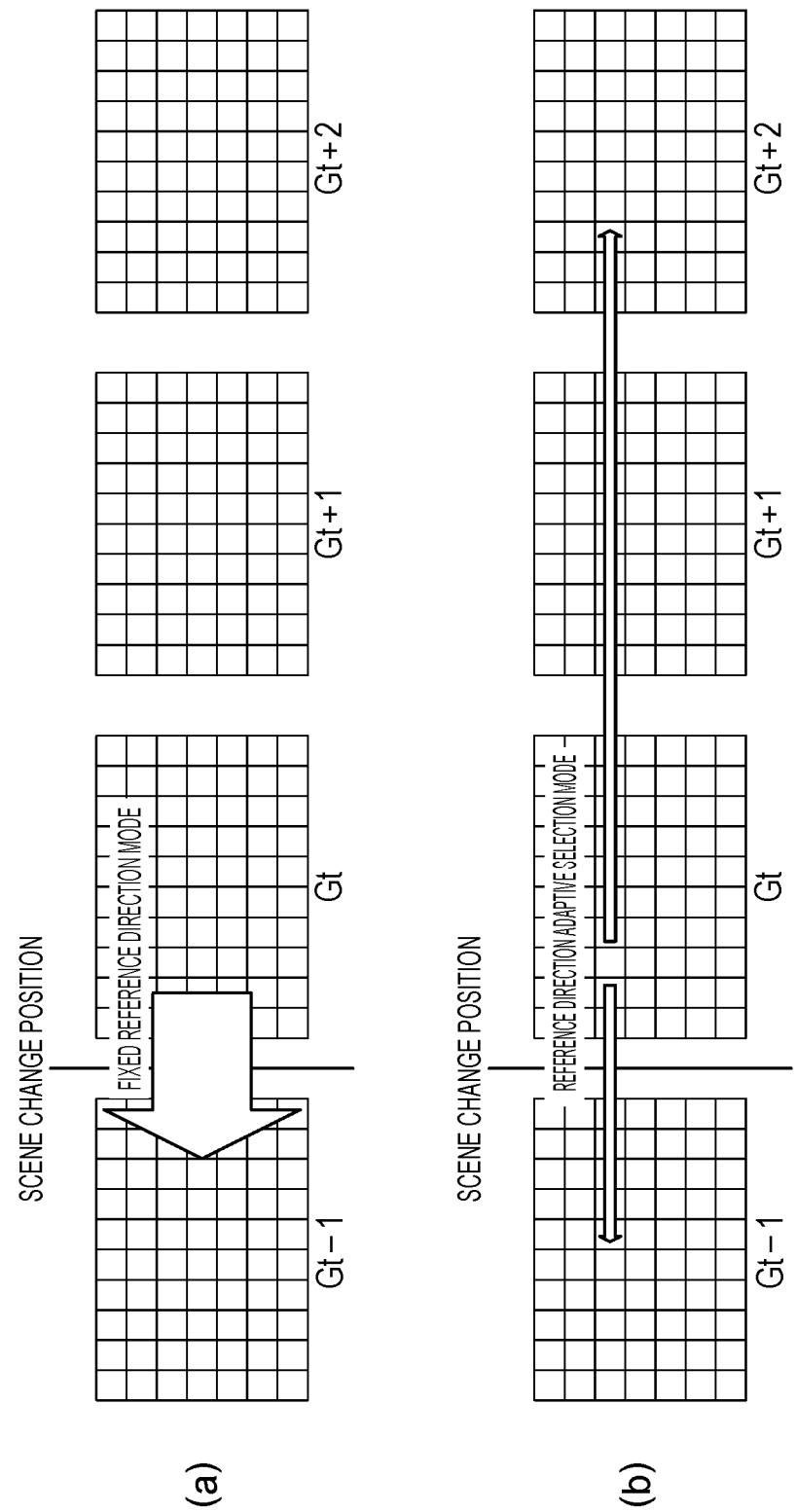
FIG. 6 is a diagram showing an operation example in the first mode.

FIG. 6 shows an operation example in the first mode. For example, in a case where a scene change occurs between an encoding target image Gt and an image Gt−1, as shown in (a) of FIG. 6, if forward prediction using the image Gt−1 as a reference plane is performed in the fixed reference direction mode, encoding efficiency is degraded. However, according to the present technology, the reference direction adaptive selection mode is selected as shown in (b) of FIG. 6. For this reason, bidirectional prediction is performed in units of blocks, only the image Gt−1 before the scene change is not always used as the reference plane, and degradation of encoding efficiency as shown in (a) of FIG. 6 can be prevented.

As described above, according to the first mode, it is possible to prevent deterioration of image quality in the scene change or flash scene and of encoding efficiency.

3. Second Mode

In a second mode, encoding processing is performed by selecting a fixed reference direction mode or a reference direction adaptive selection mode according to a detection result of a monotonous luminance variation section in which luminance of an entire image monotonously increases or monotonously decreases.

3-1. First Operation in Second Mode

Next, a first operation in the second mode will be described. In the first operation, a fixed reference direction mode or a reference direction adaptive selection mode is selected according to a detection result of a monotonous luminance variation section.

Figure 7:
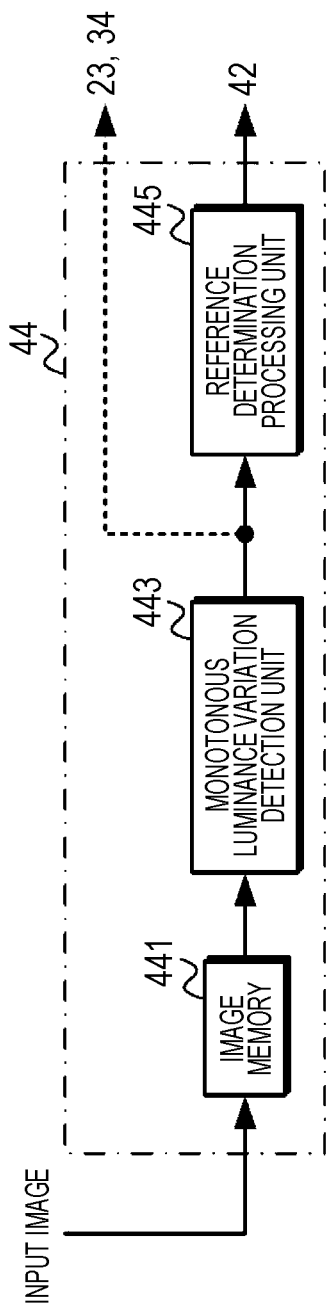
FIG. 7 is a diagram illustrating a configuration of a reference direction determination unit in a second mode.

FIG. 7 illustrates a configuration of a reference direction determination unit in the second mode. A reference direction determination unit 44 includes an image memory 441, a monotonous luminance variation detection unit 443, and a reference determination processing unit 445.

The image memory 441 stores an input image. Further, the image memory 441 outputs the stored input image to the monotonous luminance variation detection unit 443.

The monotonous luminance variation detection unit 443 detects monotonous luminance variation on the basis of the input image stored in the image memory 441. The monotonous luminance variation detection unit 443 calculates a luminance average value a screen, determines as monotonous luminance variation in a case where the luminance average value monotonously increases or monotonously decreases for each frame, and outputs a detection result of the monotonous luminance variation to the reference determination processing unit 445.

The reference determination processing unit 445 determines which one of the fixed reference direction mode or the reference direction adaptive selection mode to be used in inter prediction on the basis of the detection result of the monotonous luminance variation. The reference determination processing unit 445 selects the fixed reference direction mode in a case where an encoding target image is determined as a monotonous luminance variation section, and selects the reference direction adaptive selection mode in a case where it is not determined as the monotonous luminance variation section. The reference determination processing unit 445 then outputs a selection result to the motion prediction/compensation unit 42.

Figure 8:
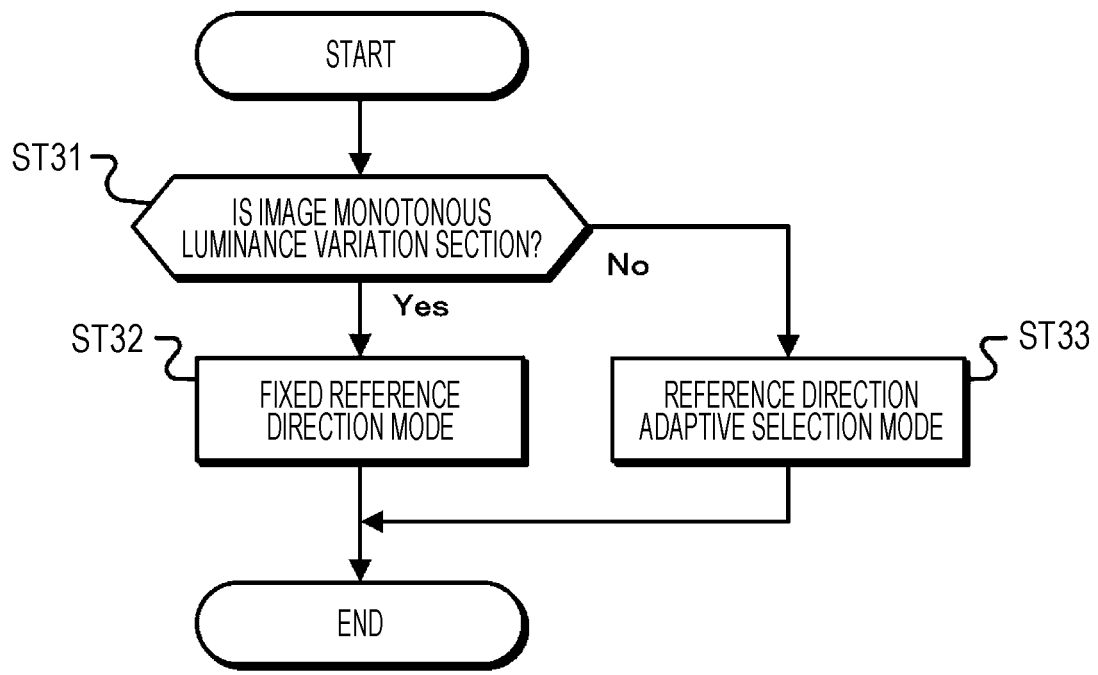
FIG. 8 is a flowchart illustrating an operation of the reference direction determination unit in the second mode.

FIG. 8 is a flowchart illustrating an operation of the reference direction determination unit in the second mode. In step ST31, the reference direction determination unit determines whether it is a monotonous luminance variation section. The reference direction determination unit 44 proceeds to step ST32 in a case where it is determined that an encoding target image is a monotonous luminance variation section, and proceeds to step ST33 in a case where it is not determined that it is the monotonous luminance variation section.

In step ST32, the reference direction determination unit selects a fixed reference direction mode. The reference direction determination unit 44 makes the motion prediction/compensation unit 42 use the fixed reference direction mode when performing inter prediction on the encoding target image.

In step ST33, the reference direction determination unit selects a reference direction adaptive selection mode. The reference direction determination unit 44 makes the motion prediction/compensation unit 42 use the reference direction adaptive selection mode when performing inter prediction on the encoding target image.

Figure 9:
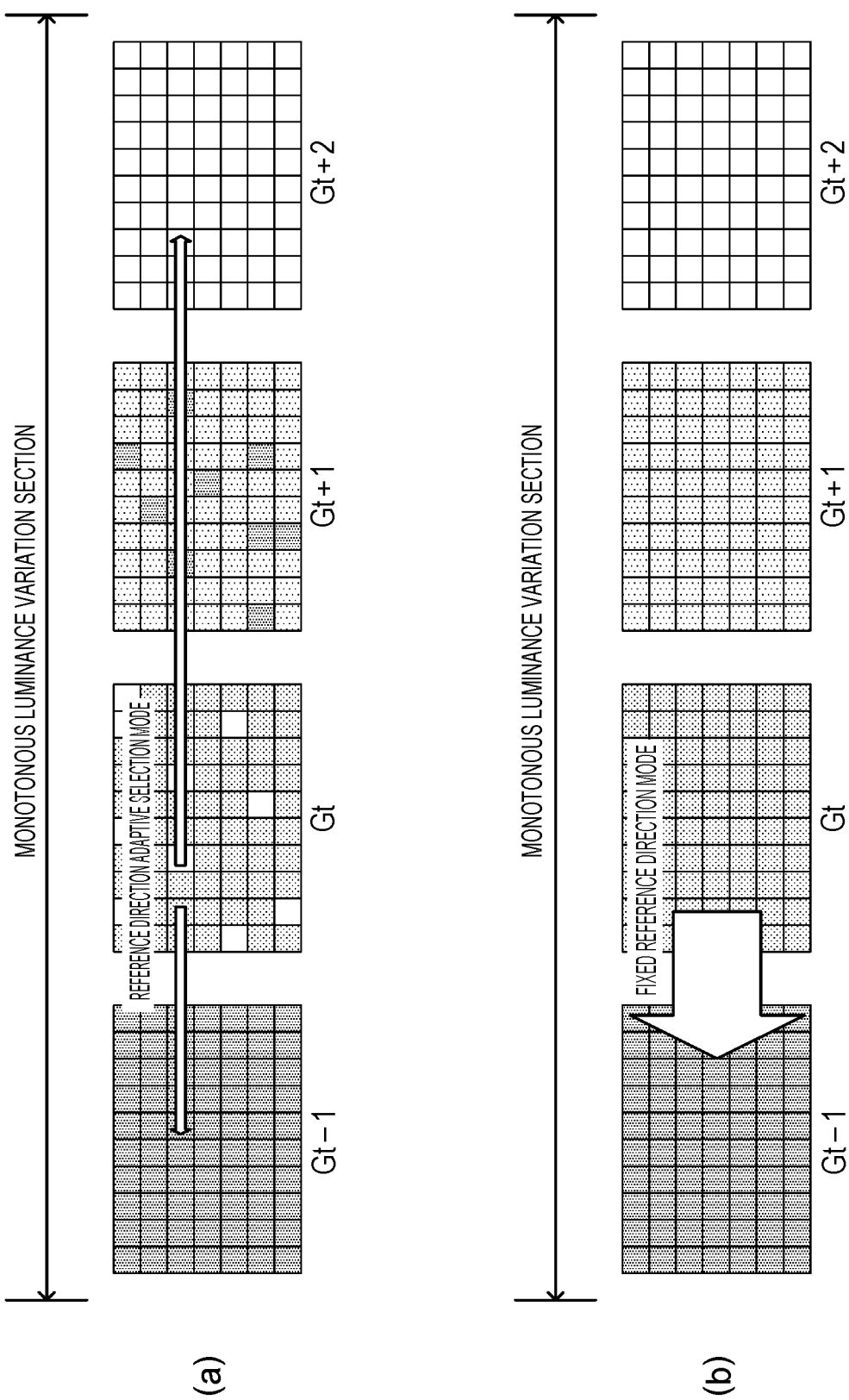
FIG. 9 is a diagram showing an operation example in the second mode.

FIG. 9 shows an operation example in the second mode. For example, in a case where an encoding target image Gt is in a luminance variation section of images Gt−1 to Gt+2, if bidirectional prediction is performed in units of blocks using the image Gt−1 and Gt+2 as reference planes in the reference direction adaptive selection mode as shown in (a) of FIG. 9, there is a possibility that a decoded image will have luminance variation in a screen, leading to reduction in image quality. However, according to the present technology, the fixed reference direction mode is selected as shown in (b) of FIG. 9, so that luminance variation in a screen based on the encoding processing can be prevented.

Thus, according to the second mode, a decoded image with good image quality can be obtained in the luminance variation section.

3-2. Second Operation in Second Mode

Next, a second operation in the second mode will be described. In the second operation, a detection result of monotonous luminance variation is output to a filter processing unit 34, and an operation of the filter processing unit 34 is controlled according to the detection result of the monotonous luminance variation, so that encoding can be performed efficiently while suppressing degradation of image quality of a decoded image.

Figure 10:
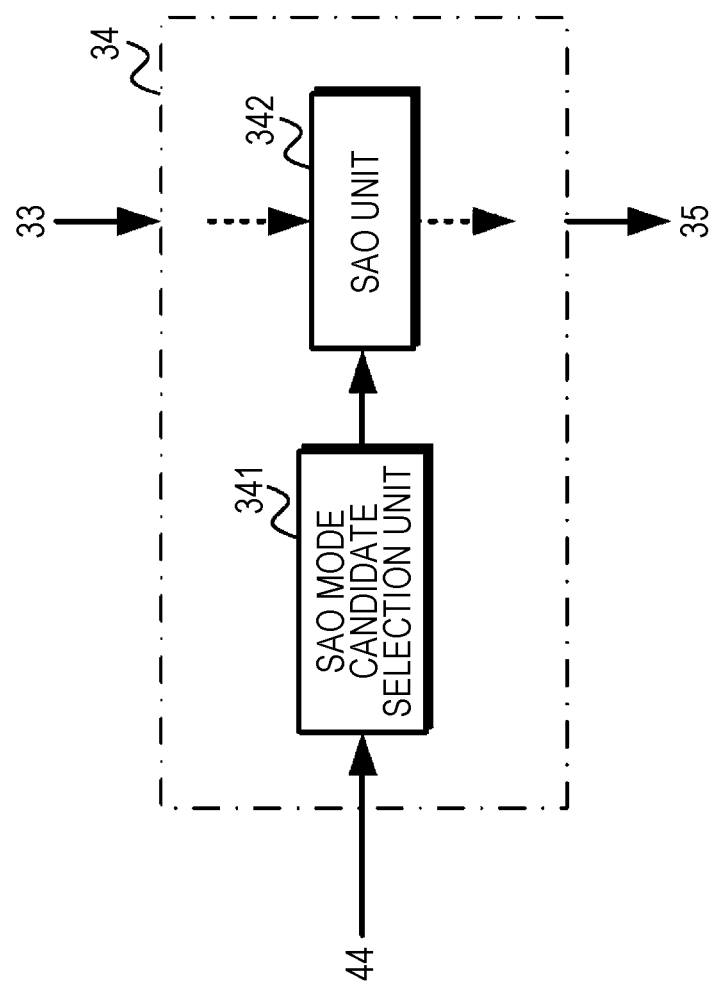
FIG. 10 is a diagram illustrating a part of a configuration of a filter processing unit.

FIG. 10 illustrates a part of a configuration of the filter processing unit. The filter processing unit 34 includes a sample adaptive offset (SAO) mode candidate selection unit 341 and a SAO unit 342. Note that the SAO mode candidate selection unit 341 may be provided in a reference direction determination unit 44.

In a case where the encoding target image is determined as a monotonous luminance variation section (fixed reference direction mode), the SAO mode candidate selection unit 341 limits a candidate for sample adaptive offset, processing performed by the SAO unit 342 to a band offset (BO) only, and in a case where it is not determined as the monotonous luminance variation section (reference direction adaptive selection mode), the candidate mode is set to BO and an edge offset (EO).

Figure 11:
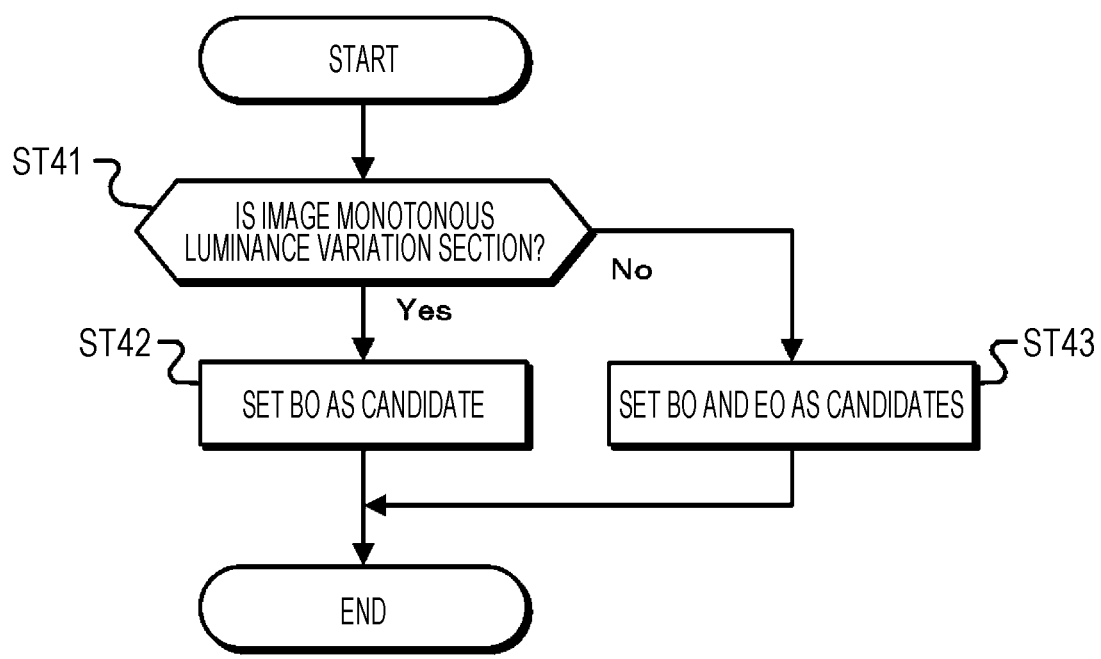
FIG. 11 is a flowchart illustrating an operation of a SAO mode candidate selection unit.

FIG. 11 is a flowchart illustrating an operation of the SAO mode candidate selection unit. In step ST41, the SAO mode candidate selection unit 341 determines whether it is a monotonous luminance variation section. The SAO mode candidate selection unit 341 proceeds to step ST42 in a case where it is determined that an encoding target image is a monotonous luminance variation section by the reference direction determination unit 44, and proceeds to step ST43 in a case where it is not determined that it is the monotonous luminance variation section.

In step ST42, the SAO mode candidate selection unit sets BO as a candidate. The SAO mode candidate selection unit 341 causes the SAO unit 342 to perform the SAO processing on a decoded image using only BO as the candidate.

In step ST43, the SAO mode candidate selection unit sets BO and EO as candidates. The SAO mode candidate selection unit 341 causes the SAO unit 342 to perform the SAO processing on the decoded image using BO and EO as the candidates.

FIG. 12 shows "Sample adaptive offset syntax" of the above-mentioned HEVC standard. In a case where a candidate mode of the SAO processing is restricted to only BO, the image processing apparatus 10 designates SaoTypeIdx for "sao_type_idx_luma" and "sao_type_idx_croma" indicated by dashed frames FRa and FRb as "1: Band Offset", and prevents "2: Edge Offset" from being selected.

Figure 14:
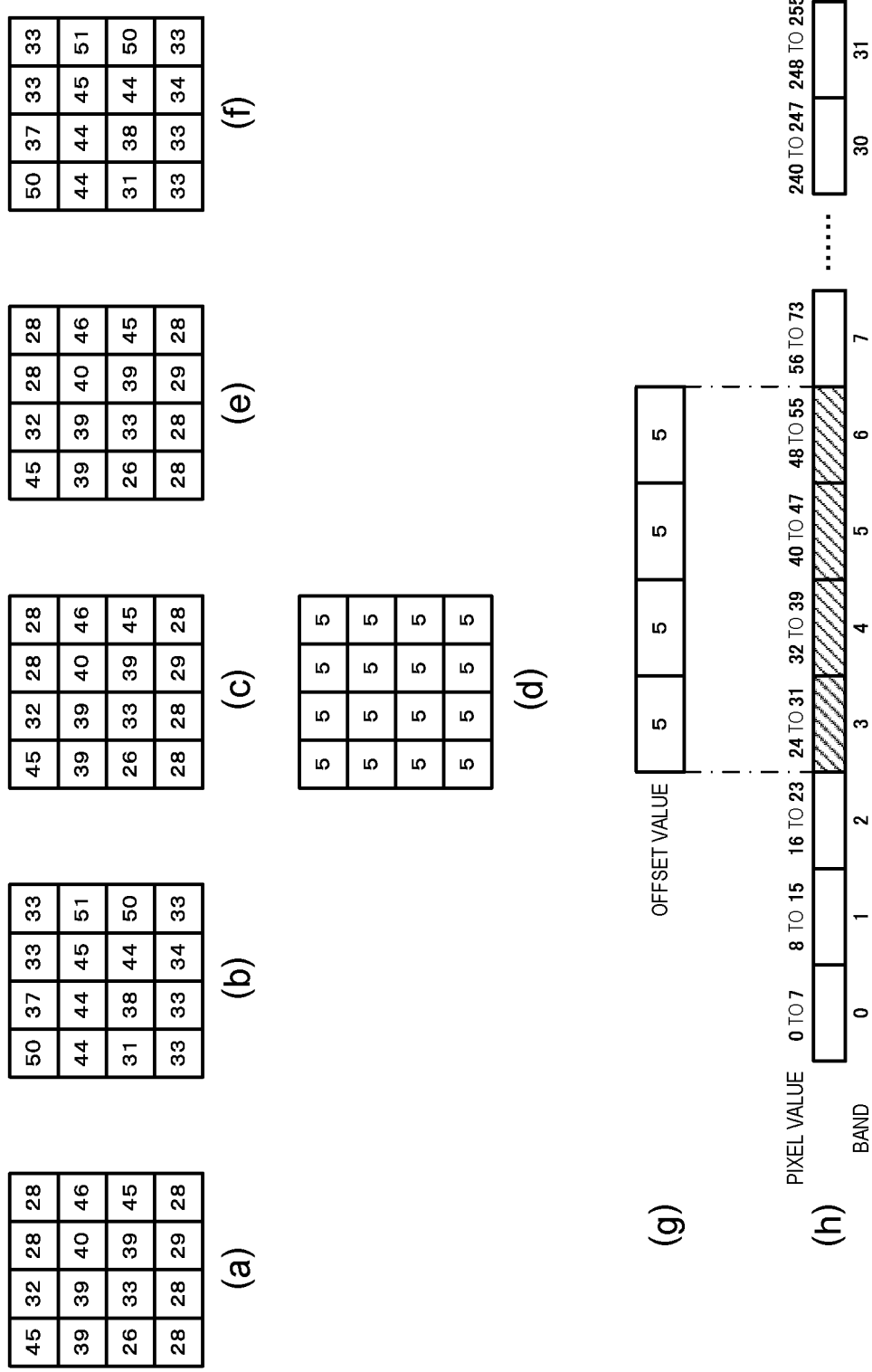
FIG. 14 is a diagram illustrating SAO processing.

FIG. 13 illustrates the second operation. A candidate mode of the SAO processing is only BO in a monotonous luminance variation section, and candidate modes thereof are BO and EO in other sections. FIG. 14 illustrates the SAO processing. (a) of FIG. 14 shows a reference image, (b) of FIG. 14 shows an encoding target image, (c) of FIG. 14 shows a predicted image, and (d) of FIG. 14 shows residual data. Further, (e) of FIG. 14 shows a decoded image before the SAO processing, and (f) of FIG. 14 shows a decoded image after the SAO processing. (h) of FIG. 14 shows a case where pixel values 0 to 255 are divided into 32 bands if a bit depth of pixels is 8 bits (pixel values are 0 to 255). Here, since a minimum pixel value of the decoded image before the SAO processing is "26" and a maximum pixel value thereof is "46", four bands of bands 3 to 6 are selected. Here, if BO processing is performed by setting offset values of four bands of bands 3 to 6 to "5" as shown in (g) of FIG. 14, the decoded image after the SAO processing shown in (e) of FIG. 14 is identical to the encoding target image. Therefore, the offset value and merge coding are used, the decoded image identical to the input image can be reproduced with a small code amount. In addition, in a case where screen luminance changes uniformly in the monotonous luminance variation section, by prohibiting EO, luminance of some areas in a screen, for example, a contour area, can be prevented from being processed to luminance different from other areas.

In this way, by limiting the candidate mode of the SAO processing to only BO in the monotonous luminance variation section, in a case where the pixel values are within a range of four bands, for example, a luminance value can be processed uniformly with the same offset. Thus, image quality of the decoded image can be reduced and encoding processing can be performed efficiently.

3-3. Third Operation in Second Mode

Next, a third operation in the second mode will be described. In the third operation, a detection result of monotonous luminance variation is output to an orthogonal transformation unit 23, and an operation of the orthogonal transformation unit 23 is controlled according to the detection result of the monotonous luminance variation, so that encoding can be performed efficiently while suppressing degradation of image quality of a decoded image.

Figure 15:
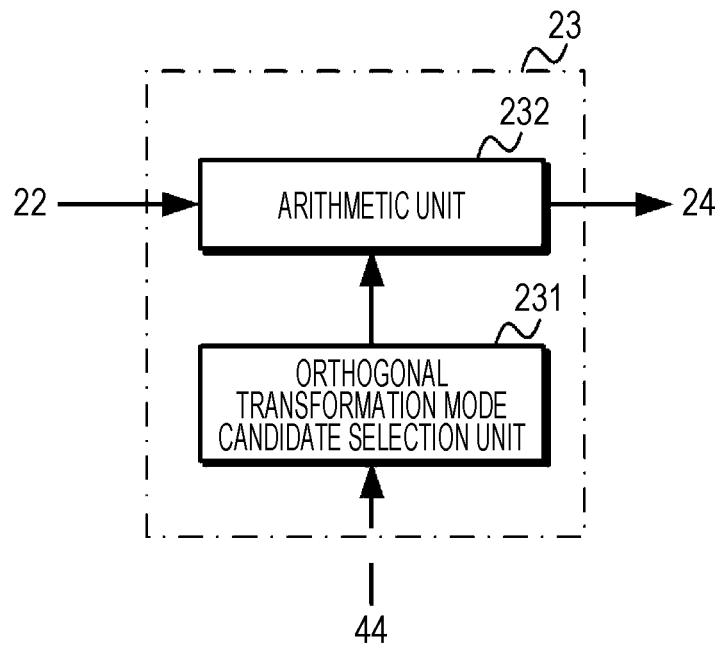
FIG. 15 is a diagram illustrating a part of a configuration of an orthogonal transformation unit.

FIG. 15 illustrates a part of a configuration of the orthogonal transformation unit. The orthogonal transformation unit 23 includes an orthogonal transformation mode candidate selection unit 231 and an arithmetic unit 232. Note that the orthogonal transformation mode candidate selection unit 231 may be provided in the reference direction determination unit 44.

In the orthogonal transformation mode candidate selection unit 231, an orthogonal transformation mode can be selected from a plurality of candidate modes. For example, discrete cosine transform (DCT)-II, DCT-V, DCT-VIII, discrete sine transform (DST)-I, DST-VII are provided as the candidate modes, and any one of the orthogonal transformation modes can be selected. In a case where the image is determined as a monotonous luminance variation section (fixed reference direction mode), the orthogonal transformation mode candidate selection unit 231 sets the orthogonal transformation mode candidate to DCT-II, which is an orthogonal transformation mode suitable for uniform luminance change. Further, in a case where it is not determined as a monotonous luminance variation section (reference direction adaptive selection mode), the orthogonal transformation mode candidate selection unit 231 sets the candidate mode to all the orthogonal transformation modes.

The arithmetic unit 232 selects an optimum mode from the candidate modes selected by the orthogonal transformation mode candidate selection unit 231, for example, a candidate mode in which components after orthogonal transformation of a difference image are concentrated on a low frequency side, and performs orthogonal transformation of the difference image.

Figure 16:
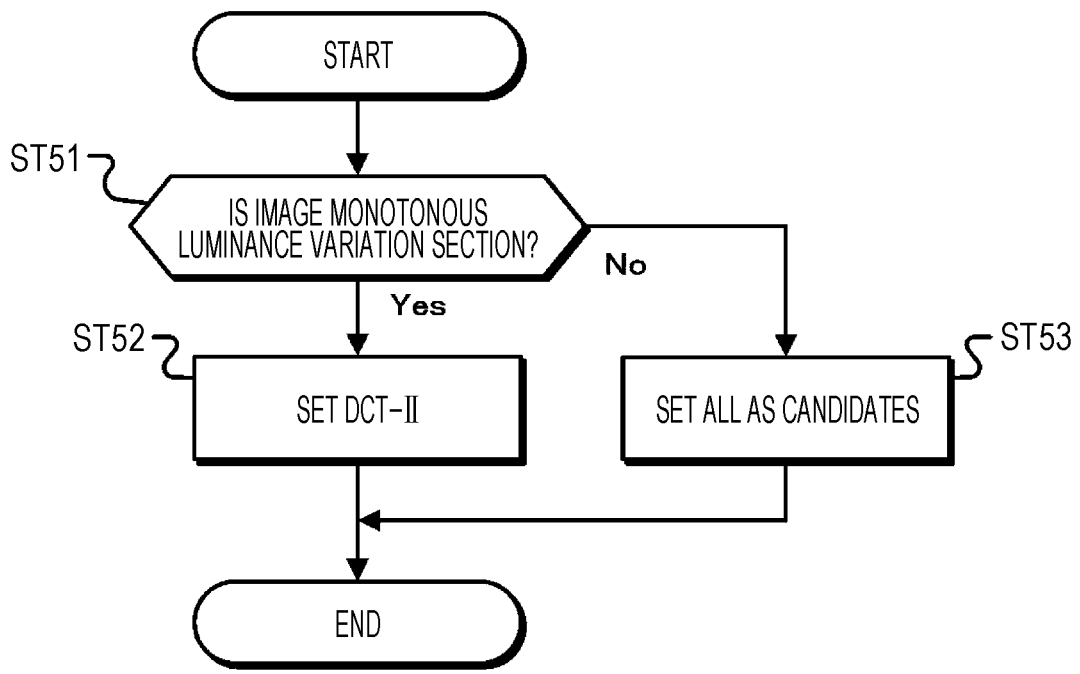
FIG. 16 is a flowchart illustrating an operation of an orthogonal transformation mode candidate selection unit.

FIG. 16 is a flowchart illustrating an operation of the orthogonal transformation mode candidate selection unit. In step ST51, the orthogonal transformation mode candidate selection unit 231 determines whether it is a monotonous luminance variation section. The orthogonal transformation mode candidate selection unit 231 proceeds to step ST52 in a case where an encoding target image is determined as a monotonous luminance variation section by the reference direction determination unit 44, and proceeds to step ST53 in a case where it is not determined as the monotonous luminance variation section.

In step ST52, the orthogonal transformation mode candidate selection unit sets DCT-II as a candidate. The orthogonal transformation mode candidate selection unit 231 causes the arithmetic unit 232 to perform orthogonal transformation processing on a difference image using only DCT-II as the candidate.

In step ST53, the orthogonal transformation mode candidate selection unit sets all modes as candidates. The orthogonal transformation mode candidate selection unit 231 causes the arithmetic unit 232 to perform the orthogonal transformation processing on the difference image using all the selectable orthogonal transformation modes as the candidates.

If such processing is performed, DCT-II orthogonal transformation is performed by the arithmetic unit 232 in a case where encoding target image is determined as the monotonous luminance variation section. Therefore, an amount of data after the orthogonal transformation is smaller in the monotonous luminance variation section than a case where other orthogonal transformations are used, and coding efficiency can be increased.

3-4. Fourth Operation in Second Mode

Next, a fourth operation in the second mode will be described. In the fourth operation, in a case where a fixed reference direction mode is selected and a reference plane is fixed when an interlaced image or a plurality of reference frames is searched, syntax is changed to increase encoding efficiency. For example, in a case where there is a plurality of indexes in a reference image list in a monotonous luminance variation section, an index value in a reference direction used for prediction is changed to an index value with a small code amount. FIG. 17 shows "Reference picture list modification syntax" of the AVC standard. In this case, in encoding processing corresponding to the AVC standard, an index value of a reference picture list (RefPicList) is changed by elements of broken line frames FRc and FRd in "Reference picture list modification syntax". Note that the reference image list may be changed by a lossless encoding unit 25, for example. In this case, the lossless encoding unit 25 corresponds to an information change processing unit.

FIG. 18 shows a reference image list in a case of an interlaced image. Note that in FIG. 18, a B picture in a top field is an encoding target image. In a case where the encoding target image is determined to be a monotonous luminance variation section and a fixed reference direction mode is selected, an image with a short reference distance an image with a small time difference), that is, an image with a small luminance difference is desirable. Here, in a case where a small value "0" is used for a field image identical to the encoding target image as in a conventional case, a reference image list of an I/P picture in a forward top field is "RefPicList0=0", and a reference image list of an I/P picture in a forward bottom field having a reference distance shorter than that of the I/P picture in the forward top field is "RefPicList0=1". On the other hand, in the fourth operation, each index value is changed so that the reference image list of the I/P picture in the forward bottom field having the reference distance shorter than that of the I/P picture in the forward top field is set to "RefPicList0=0", and the reference image list of the I/P picture in the forward top field is "RefPicList0=1".

In this way, if the reference image list of the reference plane with the short reference distance is changed to "RefPicList=0", a code with a smaller bit depth is assigned as the value is smaller in the encoding processing of the reference image list. Thus, a coding amount of the reference image list can be reduced.

4. Combination of First Mode and Second Mode

Figure 19:
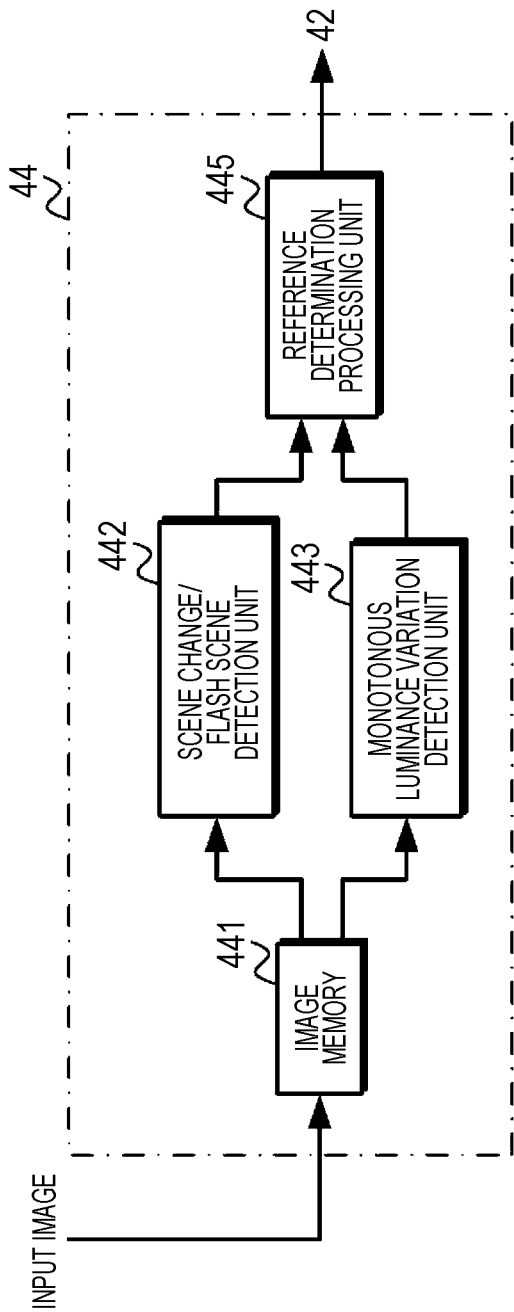
FIG. 19 is a diagram illustrating a configuration of a reference direction determination unit is a case where the first mode and the second mode are combined.

Next, a case where the first form and the second mode are combined will be described. FIG. 19 illustrates a configuration of a reference direction determination unit in a case where the first mode and the second mode are combined. A reference direction determination unit 44 includes an image memory 441, a scene change/flash scene detection unit 442, a monotonous luminance variation detection unit 443, and a reference determination processing unit 445.

The image memory 441 stores an input image. Further, the image memory 441 outputs the stored input image to the scene change/flash scene detection unit 442 and the monotonous luminance variation detection unit 443.

The scene change/flash scene detection unit 442 detects a scene change or a flash scene on the basis of the input image stored in the image memory 441. The scene change/flash scene detection unit 442 detects a scene change or a flash scene on the basis of changes in luminance and frequency components between frames, and outputs a detection result to the reference determination processing unit 445.

The monotonous luminance variation detection unit 443 detects monotonous luminance variation on the basis of the input image stored in the image memory 441. The monotonous luminance variation detection unit 443 calculates a luminance average value in a screen, determines as monotonous luminance variation in a case where the luminance average value monotonously increases or monotonously decreases for each frame, and outputs a detection result of the monotonous luminance variation to the reference determination processing unit 445.

The reference determination processing unit 445 determines which one of a fixed reference direction mode or a reference direction adaptive selection mode to be used in inter prediction on the basis of the detection result of the scene change or flash scene and the detection result of the monotonous luminance variation, and outputs a selection result of the mode to a motion prediction/compensation unit 42.

Figure 20:
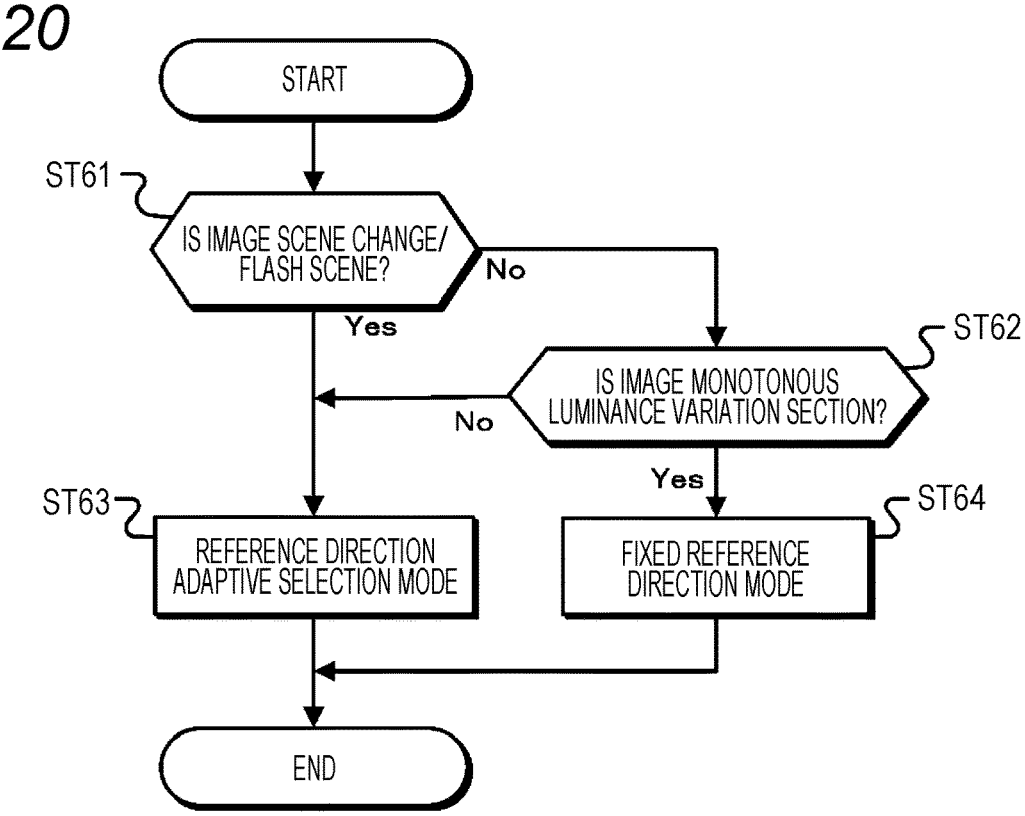
FIG. 20 is a flowchart illustrating an operation of the reference direction determination unit.

FIG. 20 is a flowchart illustrating an operation of the reference direction determination unit, in a case where priority is given to a detection result of a scene change or a flash scene. In step ST61, the reference direction determination unit determines whether it is a scene change or a flash scene. The reference direction determination unit 44 proceeds to step ST62 in a case where it is not determined that an encoding target image is a scene change or a flash scene, and proceeds to step ST63 in a case where it is determined that it is the scene change or flash scene.

In step ST62, the reference direction determination unit determines whether it is a monotonous luminance variation section. The reference direction determination unit 44 proceeds to step ST63 in a case where it is not determined that the encoding target image is a monotonous luminance variation section, and proceeds to step ST64 in a case where it is determined that it is the monotonous luminance variation section.

In step ST63, the reference direction determination unit selects a reference direction adaptive selection mode. The reference direction determination unit 44 sets an operation of the motion prediction/compensation unit 42 so that the reference direction adaptive selection mode is used in inter prediction on the encoding target image.

In step ST64, the reference direction determination unit selects a fixed reference direction mode. The reference direction determination unit 44 sets the operation of the motion prediction/compensation unit 42 so that the fixed reference direction mode is used in the inter prediction on the encoding target image.

As described above, in a case where priority is given to the detection result of the scene change or flash scene, the reference direction adaptive selection mode is selected in a case where it is determined that the encoding target image is the scene change or flash scene and in a case where it is not determined that it is the scene change/flash scene and the monotonous luminance variation section, and the fixed reference direction mode is selected in the other cases.

Figure 21:
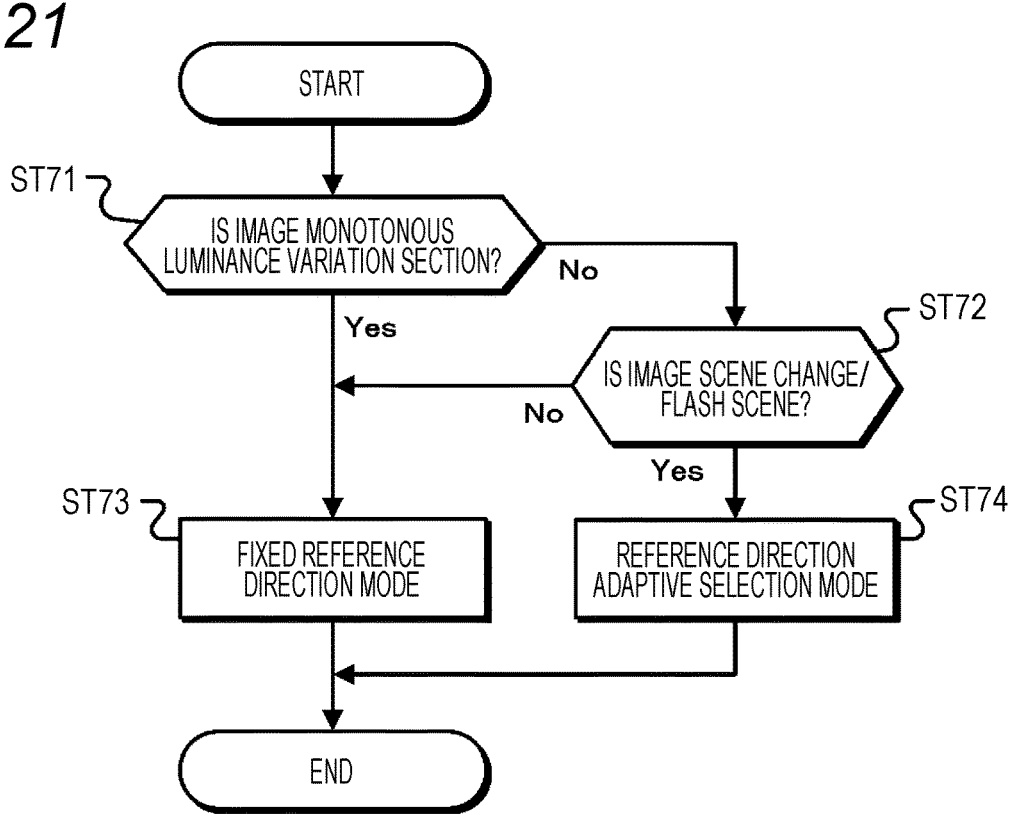
FIG. 21 is a flowchart illustrating another operation of the reference direction determination unit.

FIG. 21 is a flowchart illustrating another operation of the reference direction determination unit, in a case where priority is given to a detection result of a monotonous luminance variation section. In step ST71, the reference direction determination unit determines whether it is a monotonous luminance variation section. The reference direction determination unit 44 proceeds to step ST72 in a case where it is not determined that an encoding target image is a monotonous luminance variation section, and proceeds to step ST73 in a case where it is determined that it is the monotonous luminance variation section.

In step ST72, the reference direction determination unit determines whether it is a scene change or a flash scene. The reference direction determination unit 44 proceeds to step ST73 in a case where it is not determined that the encoding target image is a scene change or a flash scene, and proceeds to step ST74 in a case where it is determined that it is the scene change or flash scene.

In step ST73, the reference direction determination unit selects a fixed reference direction mode. The reference direction determination unit 44 sets the operation of the motion prediction/compensation unit 42 so that the fixed reference direction mode is used in the inter prediction on the encoding target image.

In step ST74, the reference direction determination unit selects a reference direction adaptive selection mode. The reference direction determination unit 44 sets the operation of the motion prediction/compensation unit 42 so that the reference direction adaptive selection mode is used in the inter prediction on the encoding target image.

As described above, in a case where priority is given to the detection result of the monotonous luminance variation section, the fixed reference direction mode is selected in a case where it is determined that the encoding target image is the monotonous luminance variation section and in a case where it is not determined that it as the monotonous luminance variation section and the scene change/flash scene, and the reference direction adaptive selection mode is selected in the other cases.

Therefore, if the first operation and the second operation are performed in combination, even if a scene change/flash scene and monotonous increase or monotonous decrease in luminance occur, encoding can be performed efficiently while suppressing degradation of image quality of a decoded image.

5. Third Mode

Next, a third mode shown in FIG. 1 will be described. In the third mode, an occlusion area in a screen is detected, and in a case where there is an occlusion area, a reference direction adaptive selection mode is selected and encoding processing is performed.

Figure 22:
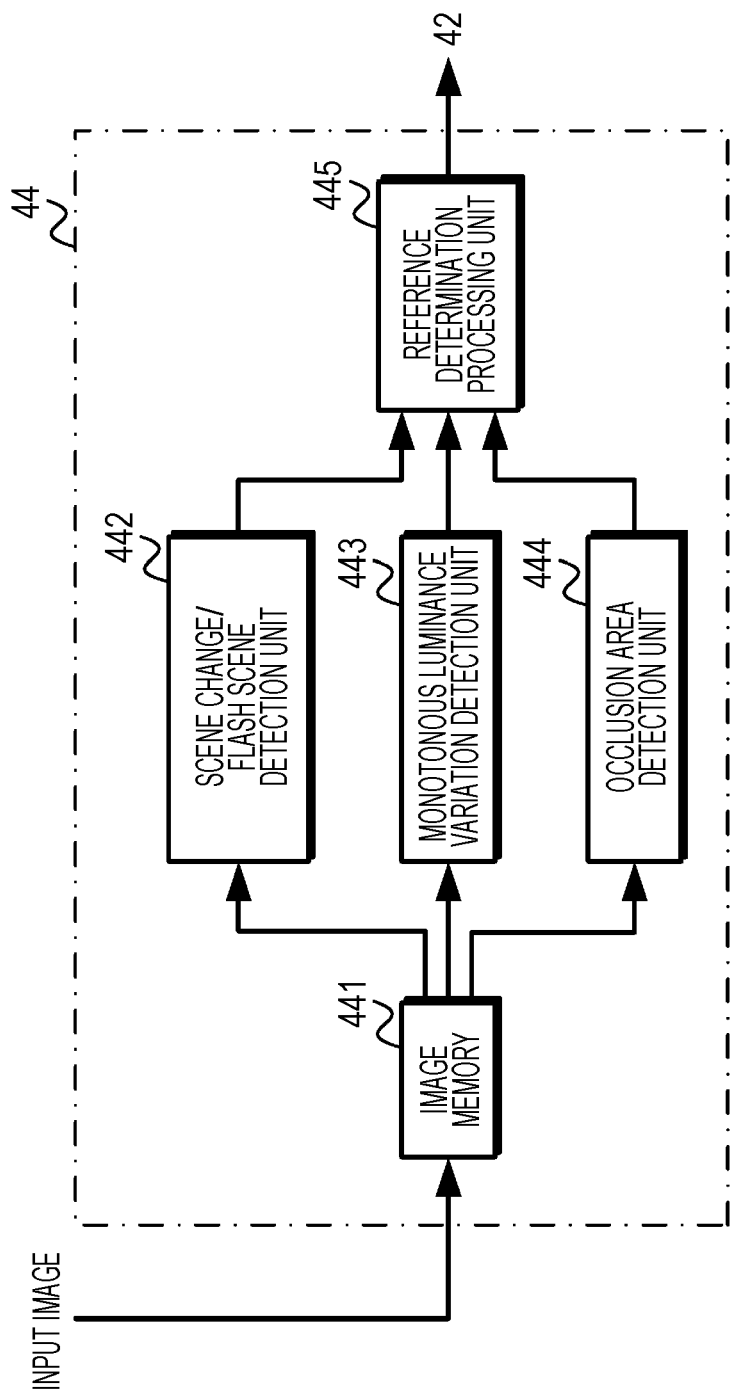
FIG. 22 is a diagram illustrating a configuration of a third mode.

FIG. 22 illustrates a configuration of the third mode. A reference direction determination unit 44 includes an image memory 441, a scene change/flash scene detection unit 442, a monotonous luminance variation detection unit 443, an occlusion area detection unit 444, and a reference determination processing unit 445.

The image memory 441 stores an input image. Further, the image memory 441 outputs the stored input image to the scene change/flash scene detection unit 442 and the monotonous luminance variation detection unit 443.

The scene change/flash scene detection unit 442 detects a scene change or a flash scene on the basis of the input image stored in the image memory 441. The scene change/flash scene detection unit 442 detects a scene change or a flash scene on the basis of changes in luminance and frequency components between frames, and outputs a detection result to the reference determination processing unit 445.

The monotonous luminance variation detection unit 443 detects monotonous luminance variation on the basis of the input image stored in the image memory 441. The monotonous luminance variation detection unit 443 calculates a luminance average value in a screen, determines as monotonous luminance variation in a case where the luminance average value monotonously increases or monotonously decreases for each frame, and outputs a detection result of the monotonous luminance variation to the reference determination processing unit 445.

The occlusion area detection unit 444 detects an occlusion area in a screen on the basis of the input image stored in the image memory 441, and outputs a detection result to the reference determination processing unit 445.

The reference determination processing unit 445 selects either a fixed reference direction mode or a reference direction adaptive selection mode on the basis of the detection result of the scene change or flash scene, the detection result of the monotonous luminance variation, and the detection result of the occlusion area, and outputs a selection result to a motion prediction/compensation unit 42. The reference determination processing unit 445 adaptively selects a reference direction for each block in the occlusion area. For example, as shown in FIG. 21, in a case where the fixed reference direction mode is selected for an encoding target image on the basis of the detection result of the scene change or flash scene and/or the detection result of the monotonous luminance variation, the fixed reference direction mode is switched to the reference direction adaptive selection mode on the basis of the detection result of the occlusion area.

Figure 23:
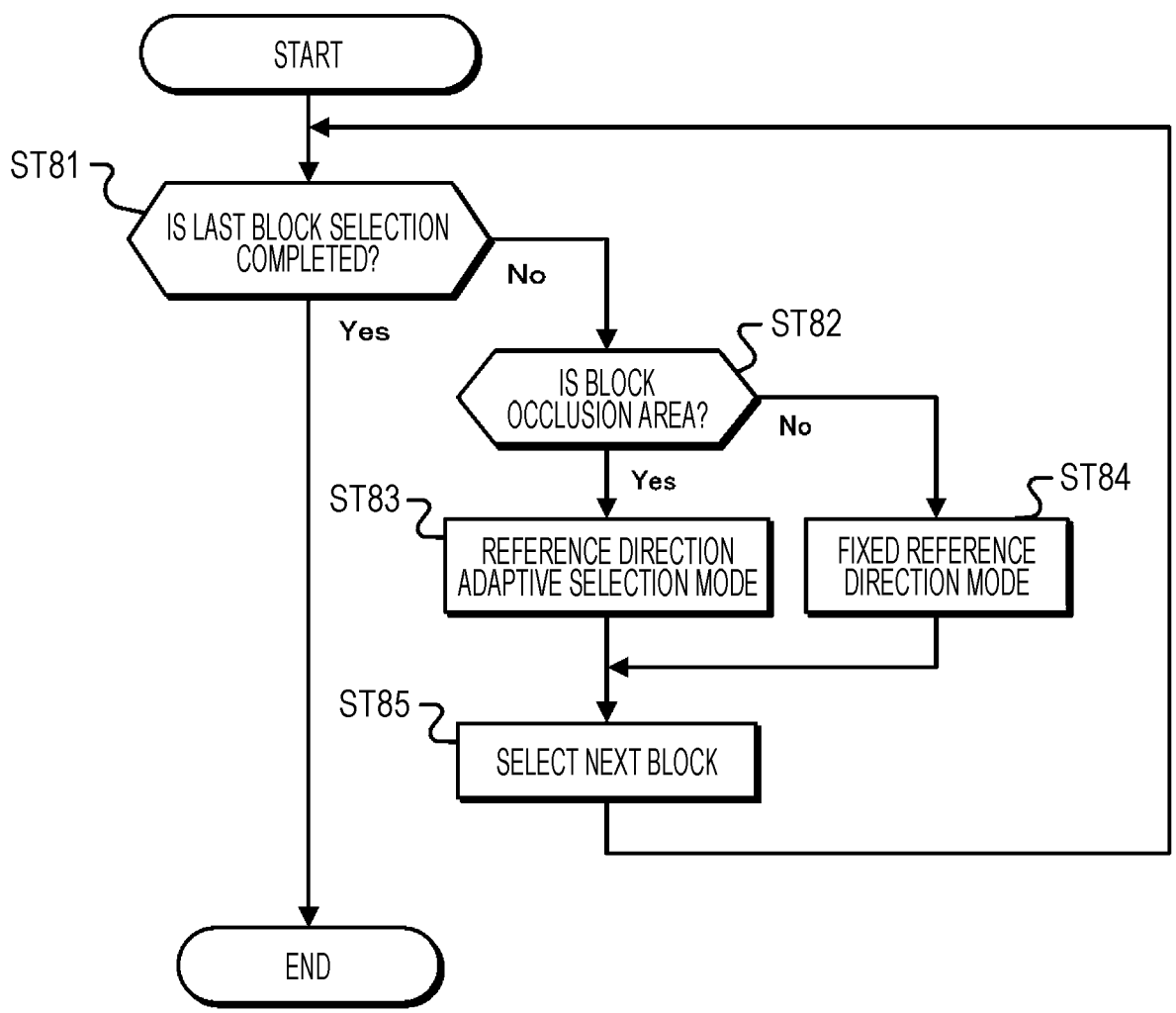
FIG. 23 is a flowchart illustrating an operation of a reference direction determination unit.

FIG. 23 is a flowchart illustrating an operation of the reference direction determination unit, and processing of the flowchart is performed for each encoded block.

In step ST81, the reference direction determination unit determines whether selection of a last block in an encoding target image has been completed. The reference direction determination unit 44 proceeds to step ST82 in a case where the selection of the last block in the image has not been completed, and finishes reference direction determination for the encoding target image in a case where the selection of the last block in the image has been completed In step ST82, the reference direction determination unit determines whether it is an occlusion area. The reference direction determination unit 44 proceeds to step ST83 in a case where the encoded block is an occlusion area block, and proceeds to step ST84 in a case where the encoded block is not an occlusion area block.

In step ST83, the reference direction determination unit selects a reference direction adaptive selection mode. The reference direction determination unit 44 sets an operation of the motion prediction/compensation unit 42 so as to use the reference direction adaptive selection mode in the inter prediction on the encoding target image, selects a next block in step ST85, and returns to step ST1. Then, the next block is processed.

In step ST84, the reference direction determination unit selects a fixed reference direction mode. The reference direction determination unit 44 sets the operation of the motion prediction/compensation unit 42 so as to use the fixed reference direction mode in the inter prediction on the encoding target image, selects a next block in step ST85, and returns to step ST1. Then, the next block is processed.

Figure 24:
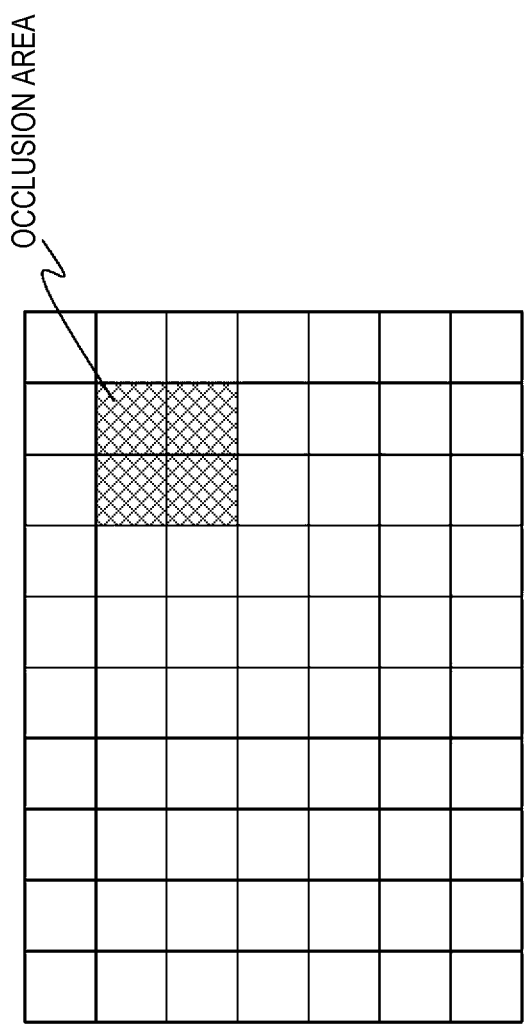
FIG. 24 is a diagram illustrating occlusion area blocks.

Therefore, since the reference direction adaptive selection mode is used in the block of the occlusion area shown in FIG. 24, it becomes possible to prevent the image of the occlusion area from being unable to be restored by fixing a reference picture list.

6. Other Modes

Incidentally, in the first to third modes described above, the case where the reference direction is determined using the input image has been described. However, determination of the reference direction is not limited to the input image, and may be performed on the basis of imaging control information.

FIG. 25 illustrates a configuration of a reference direction determination unit in a case where a reference direction is determined on the basis of imaging control information.

A reference direction determination unit 44 includes a scene change/flash scene detection unit 446, a monotonous luminance variation detection unit 447, and a reference determination processing unit 445.

The scene change/flash scene detection unit 446 detects a scene change or a flash scene on the basis of the imaging control information. The imaging control information includes flash drive control information. The scene change/ flash scene detection unit 446 uses an image when flash light has been emitted as a flash scene according to the flash drive control information, and outputs a detection result to the reference determination processing unit 445. In addition, the imaging control information includes recording start information. The scene change/flash scene detection unit 446 may detect a scene change when recording has started or a recording pause state has been canceled according to the recording start information as a scene change, and output a detection result to the reference determination processing unit 445.

The monotonous luminance variation detection unit 447 detects monotonous luminance variation on the basis of the imaging control information. The imaging control information includes exposure control information. The monotonous luminance variation detection unit 447 determines monotonous luminance variation in a case where luminance monotonously increases or decreases according to the exposure control information, and outputs a detection result of the monotonous luminance variation to the reference determination processing unit 445. The exposure control information may be information related to exposure conversion and includes, for example, at least any one of an aperture value, a shutter speed, a gain value, or an ISO sensitivity.

The reference determination processing unit 445 determines which one of a fixed reference direction mode or a reference direction adaptive selection mode to be used in inter prediction on the basis of the detection result of the scene change/flash scene and the detection result of the monotonous luminance variation, and then outputs a selection result of the mode to a motion prediction/compensation unit 42. Further, the reference determination processing unit 445 performs the processing of the above-described flowcharts shown in FIG. 5 and FIG. 8 using the detection result of the scene change/flash scene and the detection result of the monotonous luminance variation, and determines which one of the fixed reference direction mode or the reference direction adaptive selection mode to be used.

As described above, if the imaging control information is used for detecting the flash scene/scene change and the monotonous luminance variation section, the flash scene/scene change and the luminance monotone variation section can be detected more simply and accurately than a case where detection is performed on the basis of an input image.

7. Operation in Fixed Reference Direction Mode

Next, a reference plane selected in a case where it is determined to use a fixed reference direction mode will be described.

7-1. First Operation is Fixed Reference Direction Mode

In a first operation in the fixed reference direction mode, a position of a reference plane is fixed. In a case of the fixed reference direction mode, a reference determination processing unit 445 of a reference direction determination unit 44 fixes the reference plane in any of an L0 direction, an L1 direction, or both of the L0 direction and the L1 direction (also referred to as a BiP direction).

FIGS. 26 and 27 illustrate syntax used in a case where the reference plane is fixed in encoding processing corresponding to AVC standard. FIG. 26 shows "Macroblock layer syntax", and FIG. 27 shows "Sub-macroblock prediction syntax".

The reference determination processing unit 445 fixes the reference plane by using, for example, an element "mb_type" of a broken line frame FRe in "Macroblock layer syntax" shown in FIG. 26 and an element "sub_mb_type" of a broken line frame FRf in "Sub-macroblock prediction syntax" shown in FIG. 27 as a type that is a desired direction of the L0 direction, the L1 direction, and the BiP direction in a B picture.

FIG. 28 shows "Macroblock prediction syntax" used in a case where the reference plane is fixed in a search for an interlaced image and multiple reference frames in the encoding processing of the AVC standard. The reference determination processing unit 445 fixes the reference plane by setting, for example, all values of elements "ref_idx_l0" and "ref_idx_l1" of broken line frames FRg and FRh in "Macroblock prediction syntax" to the same value.

FIG. 29 shows "Prediction unit syntax" used in a case where the reference plane is fixed in encoding processing of the EVC standard. The reference determination processing unit 445 fixes the reference plane by using, for example, an element "inter_pred_idc" of a broken line frame FRj in "Prediction unit syntax".

If such processing is performed by the reference determination processing unit 445, the reference plane can be fixed in the fixed reference direction mode.

7-2. Second Operation in Fixed Reference Direction Mode

In a second operation in the fixed reference direction mode, a reference plane is selected on the basis of a temporal positional relationship. For example, in a case where the fixed reference direction mode is selected, the reference determination processing unit 445 of the reference direction determination unit 44 uses an image with a short reference distance as the reference plane.

Figure 30:
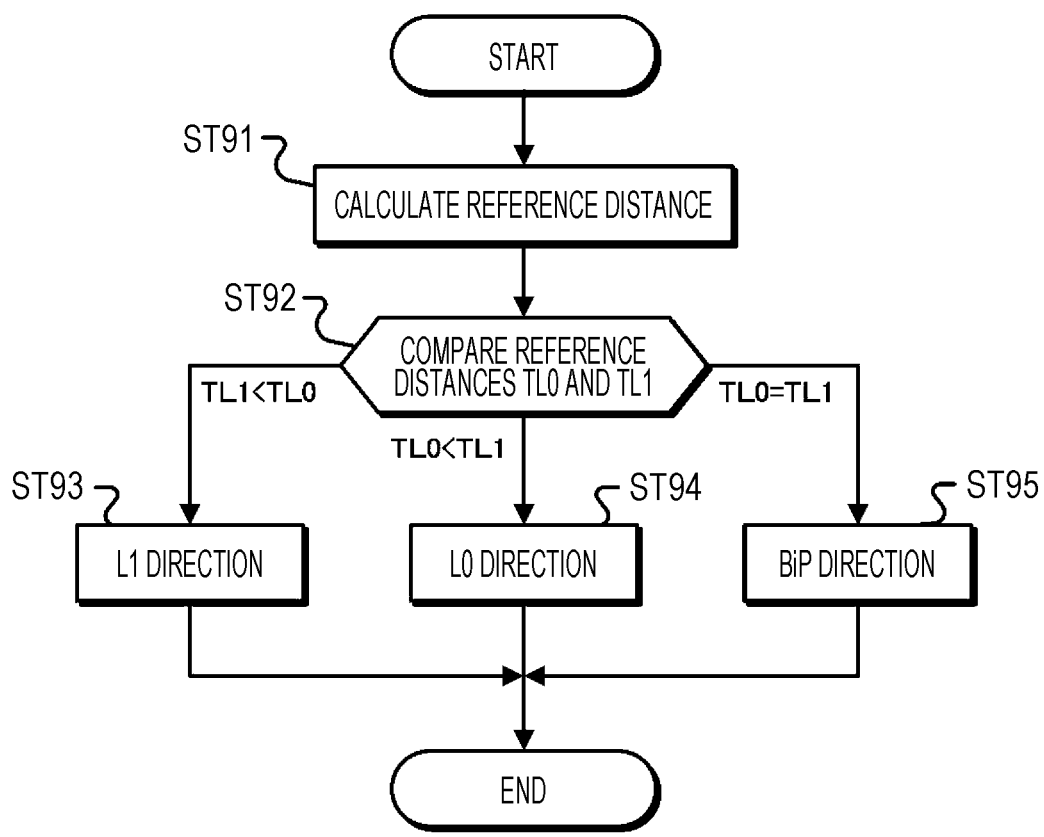
FIG. 30 is a flowchart illustrating a part of an operation of a reference determination processing unit, and a diagram showing a case where a reference image fixed mode is selected.

FIG. 30 is a flowchart illustrating a part of an operation of the reference determination processing unit, and shows a case where a reference image fixed mode is selected. In step ST91, a reference image determination unit calculates a reference distance for each reference plane. The reference determination processing unit 445 of the reference direction determination unit 44 individually calculates a reference distance TL0 from an encoding target image to a reference image L0 and a reference distance TL1 to a reference image L1, and proceeds to step ST92.

In step ST92, the reference image determination unit compares the reference distances TL0 and TL1. The reference determination processing unit 445 of the reference direction determination unit 44 proceeds to step ST93 in a case where the reference distance TL1 is shorter than the reference distance TL0, and proceeds to step ST94 in a case where the reference distance TL0 is shorter than the reference distance TL1. Also, the reference determination processing unit 445 proceeds to step ST95 in a case where the reference distance TL0 and the reference distance TL1 are equal.

In step ST93, the reference direction determination unit 41 sets the reference plane to an L1 direction. The reference determination processing unit 445 of the reference direction determination unit 44 sets the reference plane to the L1 direction because the reference distance TL1 is shorter than the reference distance TL0.

In step ST94, the reference direction determination unit 44 sets the reference plane to an L0 direction. The reference determination processing unit 445 of the reference direction determination unit 44 sets the reference plane to the L0 direction because the reference distance TL0 is shorter than the reference distance TL1.

In step ST95, the reference direction determination unit 44 sets the reference plane to a BiP direction. The reference determination processing unit 445 of the reference direction determination unit 44 sets the reference plane to the BiP direction because the reference distance TL0 and the reference distance TL1 are equal.

FIG. 31 is a diagram for describing the second operation, and the reference determination processing unit 445 has list with a short reference distance as described above, for example, in a case where the encoding target image is an image of a plurality of reference frames or an image of a Longterm reference frame. Therefore, as shown in (a) of FIG. 31, with respect to an encoding target image Pt, an image Gt−3 indicated by a solid line arrow with a short reference distance is used as a reference plane, and an image Gt−6 indicated by a broken line arrow with a long reference distance is not referred. Further, as shown in (b) of FIG. 31, with respect to an encoding target image Gt, an image Gt−1 indicated by a solid line arrow with a short reference distance is used as a reference plane, and an image Gt+2 indicated by a broken line arrow with a long reference distance is not referred. Similarly, in a case where the encoding target image is the image Gt+1, the image Gt+2 indicated by a solid line arrow with a short reference distance is used as a reference plane, and the image Gt−1 indicated by a broken line arrow with a long reference distance is not referred.

Also, the reference determination processing unit 445 uses a field image with a short reference distance as a reference plane even in a case of processing an interlaced image. Moreover, even in a case where macro block adaptive frame/field (MBAFF) processing for switching prediction in units of blocks so that a portion with a lot of motion is predicted in units of fields and a portion with a little motion is predicted in units of frames is performed on the interlaced image, the reference determination processing unit 445 uses a field image or a frame image with a short reference distance as a reference plane.

Therefore, since an image having a short reference distance is used as a reference plane in a monotonous luminance variation section, it is possible to efficiently perform encoding while suppressing deterioration in image quality of a decoded image.

Figure 32:
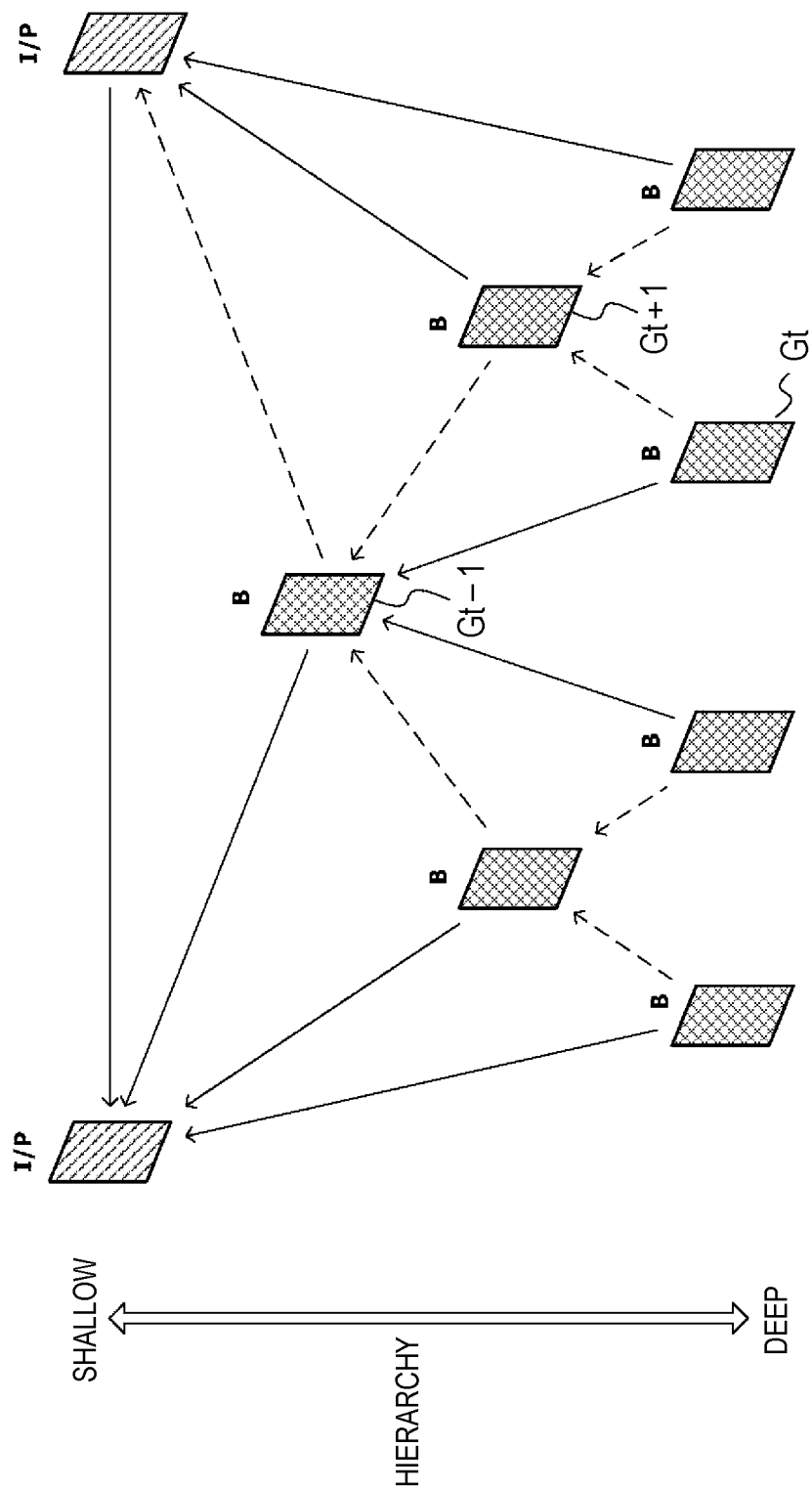
FIG. 32 is a diagram illustrating an operation in a case where a reference image is selected on the basis of a temporal positional relationship and a hierarchical relationship.

In the second operation in the fixed reference direction mode, the reference plane may be selected on the basis of a temporal positional relationship and a hierarchical relationship. For example, in a case of the fixed reference direction mode, the reference determination processing unit 445 of the reference direction determination unit 44 selects an image in a shallower level of a hierarchy when reference distances are equal. FIG. 32 illustrates an operation in a case where a reference plane is selected on the basis of a temporal positional relationship and a hierarchical relationship, and a shallower level of the hierarchy has a lower quantization parameter QP and better image quality than a deeper level of the hierarchy. An arrow indicates a reference plane to an encoding target image, and a solid line arrow indicates the reference plane. For example, a reference distance to an image Gt−1 (B picture) and a reference distance to an image Gt+1 (B picture) are equal from an encoding target image Gt (B picture). Here, since a level of the hierarchy of the image Gt−1 is shallower than that of the image Gt+1, the reference determination processing unit 445 selects the image Gt−1 as the reference plane to the encoding target image Gt.

Therefore, since an image in a shallower level of the hierarchy and having better image quality is selected as the reference plane in the monotonous luminance variation section, it is possible to efficiently perform the encoding while further suppressing the deterioration in the image quality of the decoded image.

7-3. Third Operation in Fixed Reference Direction Mode

In a third operation in the fixed reference direction mode, a reference plane is determined according to a characteristic of an input image. In the third operation, the reference plane is selected with a direction of an image having a luminance characteristic close to that of the input image as a reference direction.

As the characteristic of the input image and the luminance, a luminance feature amount in a screen is used. For example, a luminance average value in the screen or a luminance dispersion value in the screen may be used as the feature amount. In addition, a luminance Hadamard value in the screen can be used.

Figure 33:
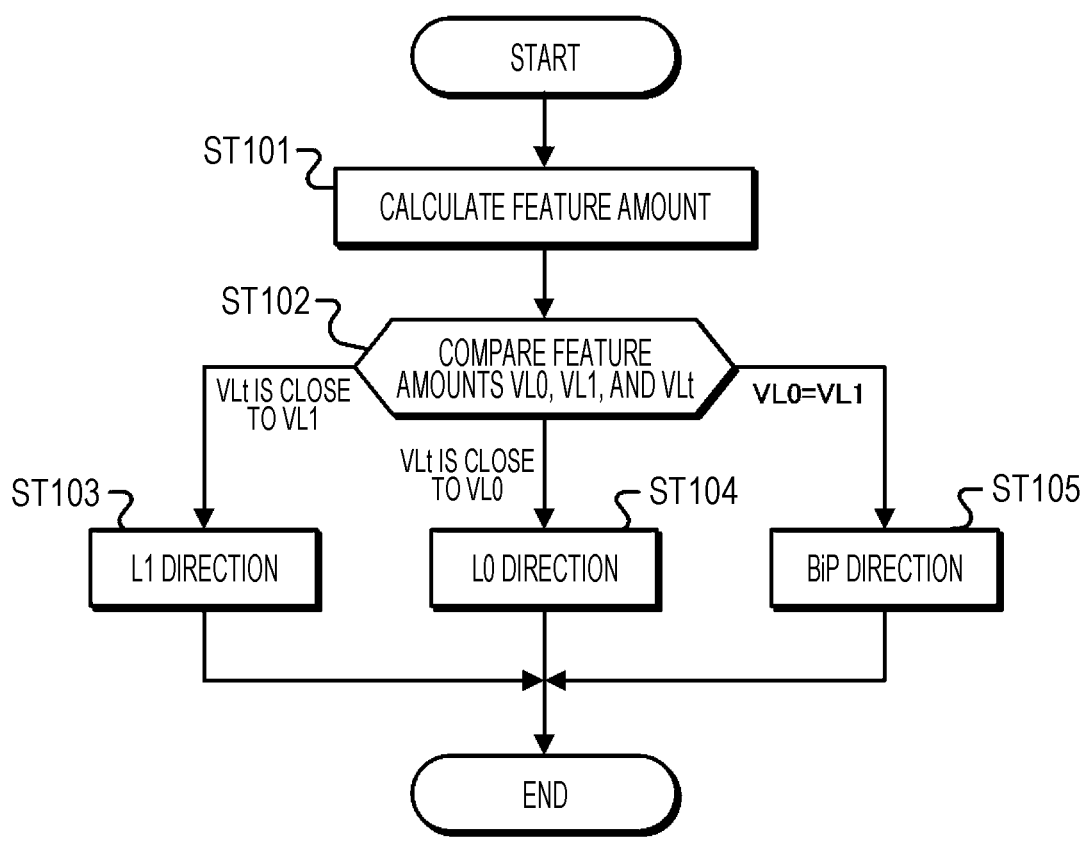
FIG. 33 is a flowchart illustrating a part of an operation of a reference determination processing unit, and a diagram illustrating a case where a reference image fixed mode is selected.

FIG. 33 is a flowchart illustrating a part of an operation of the reference determination processing unit, and shows a case where a fixed reference direction mode is selected. In step ST101, the reference direction determination unit calculates a feature amount. The reference determination processing unit 445 of the reference direction determination unit 44 individually calculates a luminance feature amount in a screen for each of an encoding target image and reference planes L0 and L1, and proceeds to step ST102.

In step ST102, the reference direction determination unit compares luminance feature amounts VL0, VL1, and VLt. The reference determination processing unit 445 of the reference direction determination unit 44 proceeds to step ST103 in a case where the feature amount VLt of the encoding target image is closer to the feature amount VL1 of the reference plane L1 than the feature amount VL0 of the reference plane L0, and proceeds to step ST104 in a case where the feature amount VLt is closer to the feature amount VL0 than the feature amount VL1. Further, the reference determination processing unit 445 proceeds to step ST105 in a case where the feature amount VL0 and the feature amount VL1 are equal.

In step ST103, the reference direction determination unit sets the reference plane to an L1 direction. The reference determination processing unit 445 of the reference direction determination unit 44 sets the reference plane to the L1 direction because the feature amount VL1 is close to the feature amount VLt.

In step ST104, the reference direction determination unit sets the reference plane to an L0 direction. The reference determination processing unit 445 of the reference direction determination unit 44 sets the reference plane to the L0 direction because the feature amount VL0 is close to the feature amount VLt.

In step ST105, the reference direction determination unit sets the reference plane to a BiP direction. The reference determination processing unit 445 of the reference direction determination unit 44 sets the reference plane to the BiP direction because the feature amount VL0 and the feature amount VL1 are equal.

If the reference plane is selected in this way, an optimal image can be selected as the reference plane on the basis of the luminance feature amount in the screen as well as the reference distance, so that efficient decoding can be performed while suppressing degradation of image quality of a decoded image.

The series of processing described in the specification can be executed by hardware, software, or a combined configuration of both. In a case where processing by software is executed, a program in which a processing sequence is recorded is installed and executed in a memory in a computer incorporated in dedicated hardware. Alternatively, the program can be installed and executed on a general-purpose computer capable of executing various processing.

For example, the program can be recorded in advance on a hard disk, a solid state drive (SSD), or a read only memory (ROM) as a recording medium. Alternatively, the program can be temporarily or permanently stored (recorded) on a removable recording medium such as a flexible disk, a compact disc read only memory (CD-ROM), a magneto optical (MO) disk, a digital versatile disc (DVD), a Blu-ray Disc (BID) (registered trademark), a magnetic disk, or a semiconductor memory card. Such a removable recording medium can be provided as so-called package software.

Further, in addition to installing the program from the removable recording medium to the computer, the program may be transferred from a download site to the computer wirelessly or by wire via a network such as a local area network (LAN) or the Internet. The computer can receive the program transferred in this way and install it on a recording medium such as a built-in hard disk.

Note that the effects described in this specification are illustration to the last and are not limited, and there may be additional effects which are not described. Further, the present technology should not be construed as being limited to the embodiments of the technology described above. The embodiments of the present technology disclose the present technology in the form of examples, and at is obvious that those skilled in the art can make modifications and substitutions of the embodiments without departing from the gist of the present technology. In other words, the scope of the claims should be considered in order to determine the gist of the present technology.

In addition, the image processing apparatus according to the present technology may have the following configuration.

(1) An image processing apparatus including a reference direction determination unit that adaptively selects, for a picture of an image included in a luminance variation section, a reference direction of temporal direction prediction in image encoding processing for each block in the picture included in the luminance variation section.

(2) The image processing apparatus according to (1), in which the reference direction determination unit adaptively selects the reference direction only for the picture of the image included in the luminance variation section for each block in the picture included in the luminance variation section.

(3) The image processing apparatus according to (2), in which the luminance variation section includes a picture of an image corresponding to a scene change or flash.

(4) The image processing apparatus according to any one of (1) to (3), in which the reference direction determination unit uniformly fixes the reference direction for a picture of an image included in a monotonous luminance variation section in the picture included in the monotonous luminance variation section.

(5) The image processing apparatus according to (4), further including a sample adaptive offset mode candidate selection unit that uses a band offset as a sample adaptive offset processing candidate for a decoded image generated using a predicted image and a restored difference image in the monotonous luminance variation section.

(6) The image processing apparatus according to (4) or (5), further including an orthogonal transformation mode candidate selection unit that sets orthogonal transformation processing for a difference image between an input image and the predicted image to an orthogonal transformation mode suitable for uniform luminance change in the monotonous luminance variation section.

(7) The image processing apparatus according to any one of (4) to (6), further including an information change processing unit that changes an index value in a reference direction used for prediction to an index value with a small code amount in a case where there is a plurality of indexes in a reference image list in the monotonous luminance variation section.

(8) The image processing apparatus according to any one of (4) to (7), in which the reference direction determination unit is processing of either uniformly fixing in the picture or adaptively selecting for each block in the picture, for a picture of an image not included in the luminance variation section and the monotonous luminance variation section.

(9) The image processing apparatus according to any one of (4) to (8), in which the reference direction determination unit fixes a reference plane in any one of an L0 direction, an L1 direction, or both of the L0 direction and the L1 direction in a case where the reference direction is fixed uniformly in a screen.

(10) The image processing apparatus according to (9), in which the reference direction determination unit selects the reference plane to be fixed on the basis of a temporal positional relationship.

(11) The image processing apparatus according to (10), in which the reference direction determination unit selects a reference plane with a short reference distance.

(12) The image processing apparatus according to (11), in which the reference direction determination unit selects the reference plane on the basis of the temporal positional relationship and a hierarchical relationship.

(13) The image processing apparatus according to (12), in which the reference direction determination unit selects a reference plane in a shallower level of a hierarchy, the reference plane in the shallower level having better image quality as compared to a reference plane in a deeper level of the hierarchy.

(14) The image processing apparatus according to any one of (4) to (13), in which the reference direction determination unit determines the reference direction according to a characteristic of the image in a case where the reference direction is fixed uniformly in a picture of a screen.

(15) The image processing apparatus according to (14), in which the reference direction determination unit selects a direction of an image having a luminance characteristic closer to that of the image as the reference direction.

(16) The image processing apparatus according to any one of (1) to (15), in which the reference direction determination unit detects an occlusion area using the input image, and adaptively selects the reference direction for each block in the detected occlusion area.

(17) The image processing apparatus according to any one of (1) to (16), in which the reference direction determination unit detects a picture of an image included in the luminance variation section on the basis of imaging control information.

INDUSTRIAL APPLICABILITY

According to the image processing apparatus and the image processing method of the present technology, for a picture of an image included in a luminance variation section, a reference direction of a temporal direction prediction in image encoding processing is adaptively selected for each block in the picture included in the luminance variation section by the reference direction determination unit. For this reason, the reference direction of the temporal direction prediction is set to an appropriate direction, and encoding can be performed efficiently while suppressing deterioration in image quality of a decoded image. Therefore, it is suitable for an electronic apparatus that encodes a moving image.

REFERENCE SIGNS LIST

10 Image processing apparatus
21 Screen rearrangement buffer
22, 33, 232 Arithmetic unit
23 Orthogonal transformation unit
24 Quantization unit
25 Lossless encoding unit
26 Accumulation buffer
27 Rate control unit
31 Inverse quantization unit
32 Inverse orthogonal transformation unit
34 Filter processing unit
35 Frame memory
36 Selection unit
41 Intra prediction unit
42 Motion prediction/compensation unit
43 Prediction selection unit
44 Reference direction determination unit
231 Orthogonal transformation mode candidate selection unit
341 SAO mode candidate selection unit
342 SAO unit
441 Image memory
442, 446 Scene change/flash scene detection unit
443, 447 Monotonous luminance variation detection unit
444 Occlusion area detection unit
445 Reference determination processing unit

The invention claimed is:

1. An image processing apparatus comprising:
a reference direction determination unit configured to adaptively select, for a picture of an image included in a luminance variation section, a reference direction of temporal direction prediction in image encoding processing for each block in the picture included in the luminance variation section,
wherein the reference direction determination unit uniformly fixes the reference direction for the picture of the image included in a monotonous luminance variation section in the picture included in the monotonous luminance variation section,
wherein the reference direction determination unit selects a reference plane to be fixed on a basis of a temporal positional relationship and a hierarchical relationship, and
wherein the reference direction determination unit is implemented via at least one processor.

2. The image processing apparatus according to claim 1, wherein the reference direction determination unit adaptively selects the reference direction only for the picture of the image included in the luminance variation section for each block in the picture included in the luminance variation section.

3. The image processing apparatus according to claim 2, wherein the luminance variation section includes a picture of an image corresponding to a scene change or flash.

4. The image processing apparatus according to claim 1, further comprising:
a sample adaptive offset mode candidate selection unit configured to use a band offset as a sample adaptive offset processing candidate for a decoded image generated using a predicted image and a restored difference image in the monotonous luminance variation section,
wherein the sample adaptive offset mode candidate selection unit is implemented via at least one processor.

5. The image processing apparatus according to claim 1, further comprising:
an orthogonal transformation mode candidate selection unit configured to set orthogonal transformation processing for a difference image between an input image and the predicted image to an orthogonal transformation mode suitable for uniform luminance change in the monotonous luminance variation section,
wherein the orthogonal transformation mode candidate selection unit is implemented via at least one processor.

6. The image processing apparatus according to claim 1, further comprising:
an information change processing unit configured to change an index value in a reference direction used for prediction to an index value with a small code amount in a case where there is a plurality of indexes in a reference image list in the monotonous luminance variation section,
wherein the information change processing unit is implemented via at least one processor.

7. The image processing apparatus according to claim 1, wherein the reference direction determination unit is processing of either uniformly fixing in the picture or adaptively selecting for each block in the picture, for a picture of an image not included in the luminance variation section and the monotonous luminance variation section.

8. The image processing apparatus according to claim 1, wherein the reference direction determination unit fixes the reference plane in any one of an L0 direction, an L1 direction, or both of the L0 direction and the L1 direction in a case where the reference direction is fixed uniformly in a screen.

9. The image processing apparatus according to claim 1, wherein the reference direction determination unit selects the reference plane with a short reference distance.

10. The image processing apparatus according to claim 1, wherein
the reference direction determination unit selects the reference plane in a shallower level of a hierarchy, the reference plane in the shallower level having better image quality as compared to a reference plane in a deeper level of the hierarchy.

11. The image processing apparatus according to claim 1, wherein the reference direction determination unit determines the reference direction according to a characteristic of the image in a case where the reference direction is fixed uniformly in a picture of a screen.

12. The image processing apparatus according to claim 11, wherein the reference direction determination unit selects a direction of an image having a luminance characteristic closer to that of the image as the reference direction.

13. The image processing apparatus according to claim 1, wherein the reference direction determination unit detects an occlusion area using an image to be subjected to the encoding processing, and adaptively selects the reference direction for each block in the detected occlusion area.

14. The image processing apparatus according to claim 1, wherein the reference direction determination unit detects the picture of the image included in the luminance variation section on a basis of imaging control information.

15. An image processing method comprising:
adaptively selecting, for a picture of an image included in a luminance variation section, a reference direction of temporal direction prediction in image encoding processing for each block in the picture included in the luminance variation section by a reference direction determination unit,
wherein the reference direction for the picture of the image included in a monotonous luminance variation section is uniformly fixed in the picture included in the monotonous luminance variation section, and
wherein a reference plane is selected to be fixed on a basis of a temporal positional relationship and a hierarchical relationship.

16. An image processing apparatus comprising:
a reference direction determination unit configured to adaptively select, for a picture of an image included in a luminance variation section, a reference direction of temporal direction prediction in image encoding processing for each block in the picture included in the luminance variation section; and
a sample adaptive offset mode candidate selection unit configured to use a band offset as a sample adaptive offset processing candidate for a decoded image generated using a predicted image and a restored difference image in the monotonous luminance variation section,
wherein the reference direction determination unit uniformly fixes the reference direction for the picture of the image included in a monotonous luminance variation section in the picture included in the monotonous luminance variation section, and wherein the reference direction determination unit and the sample adaptive offset mode candidate selection unit are each implemented via at least one processor.

17. An image processing apparatus comprising:
a reference direction determination unit configured to adaptively select, for a picture of an image included in a luminance variation section, a reference direction of temporal direction prediction in image encoding processing for each block in the picture included in the luminance variation section; and
an orthogonal transformation mode candidate selection unit configured to set orthogonal transformation processing for a difference image between an input image and the predicted image to an orthogonal transformation mode suitable for uniform luminance change in the monotonous luminance variation section,
wherein the reference direction determination unit uniformly fixes the reference direction for the picture of the image included in a monotonous luminance variation section in the picture included in the monotonous luminance variation section, and
wherein the reference direction determination unit and the orthogonal transformation mode candidate selection unit are each implemented via at least one processor.

18. An image processing apparatus comprising:
a reference direction determination unit configured to adaptively select, for a picture of an image included in a luminance variation section, a reference direction of temporal direction prediction in image encoding processing for each block in the picture included in the luminance variation section; and
an information change processing unit configured to change an index value in a reference direction used for prediction to an index value with a small code amount in a case where there is a plurality of indexes in a reference image list in the monotonous luminance variation section,
wherein the reference direction determination unit uniformly fixes the reference direction for the picture of the image included in a monotonous luminance variation section in the picture included in the monotonous luminance variation section, and
wherein the reference direction determination unit and the information change processing unit are each implemented via at least one processor.

19. An image processing apparatus comprising:
a reference direction determination unit configured to adaptively select, for a picture of an image included in a luminance variation section, a reference direction of temporal direction prediction in image encoding processing for each block in the picture included in the luminance variation section,
wherein the reference direction determination unit uniformly fixes the reference direction for the picture of the image included in a monotonous luminance variation section in the picture included in the monotonous luminance variation section,
wherein the reference direction determination unit fixes a reference plane in any one of an L0 direction, an L1 direction, or both of the L0 direction and the L1 direction in a case where the reference direction is fixed uniformly in a screen,
wherein the reference direction determination unit selects the reference plane to be fixed on a basis of a temporal positional relationship and a hierarchical relationship, and
wherein the reference direction determination unit is implemented via at least one processor.

* * * * *